US012252290B2

(12) United States Patent
Sasaki

(10) Patent No.: US 12,252,290 B2
(45) Date of Patent: Mar. 18, 2025

(54) COLLECTING TOOL

(71) Applicant: GENBE CO., LTD., Maizuru (JP)

(72) Inventor: Kenichi Sasaki, Kyoto (JP)

(73) Assignee: GENBE CO., LTD (JP)

( * ) Notice: Subject to any disclaimer, the term of this patent is extended or adjusted under 35 U.S.C. 154(b) by 201 days.

(21) Appl. No.: 17/776,335

(22) PCT Filed: Nov. 7, 2020

(86) PCT No.: PCT/JP2020/041636
§ 371 (c)(1),
(2) Date: May 12, 2022

(87) PCT Pub. No.: WO2021/095669
PCT Pub. Date: May 20, 2021

(65) Prior Publication Data

US 2022/0396387 A1 Dec. 15, 2022

(30) Foreign Application Priority Data

Nov. 12, 2019 (JP) ................................ 2019-215810
Dec. 24, 2019 (JP) ................................ 2019-240188
(Continued)

(51) Int. Cl.
*B65B 67/12* (2006.01)
*B65B 7/12* (2006.01)
*B65F 1/14* (2006.01)

(52) U.S. Cl.
CPC ............ *B65B 67/12* (2013.01); *B65F 1/1415* (2013.01); *B65B 67/1233* (2013.01); *B65F 2210/18* (2013.01)

(58) Field of Classification Search
CPC . B65B 67/12; B65B 67/1233; B65B 67/1205; B65B 67/1227; B65B 67/1238;
(Continued)

(56) References Cited

U.S. PATENT DOCUMENTS 199,507 A * 1/1878 Brubaker ............ B65B 67/1227 5/492
260,707 A * 7/1882 Pendleton ........... B65B 67/1227 248/100
(Continued)

FOREIGN PATENT DOCUMENTS

CA 2561775 A1 * 3/2008 ............. A47L 13/52
CH 567965 A5 * 10/1975 ............ B65F 1/1415
(Continued)

OTHER PUBLICATIONS

Office Action issued in JP Appln. No. 2020-138977 Applicant: Minamoto Co., Ltd. dated Nov. 17, 2020.
(Continued)

*Primary Examiner* — Taylor Morris
(74) *Attorney, Agent, or Firm* — Gregory D. DeGrazia

(57) ABSTRACT

A collecting tool (1) includes a frame body (11) that is disposed so as to surround an opening end portion of a bag (100) storing waste (D1) inside, and on which a folded portion (100*a*) of the opening end portion of the bag (100) is hooked in a state where the opening end portion of the bag (100) is folded back outward, three wires (13), a clip (12) that is provided at one end portion of each of the three wires (13) in a longitudinal direction and clamps the frame body (11) and the opening end portion of the bag (100) together in a state where the folded portion (100*a*) of the bag (100) is hooked on the frame body (11), and a fixing portion (14) that supports the other end portions of each of the three wires (13) together and is fixed to a construction material.

4 Claims, 24 Drawing Sheets

(30) Foreign Application Priority Data

| | | |
|---|---|---|
| May 1, 2020 | (JP) | 2020-097249 |
| Jun. 15, 2020 | (JP) | 2020-118078 |
| Jul. 29, 2020 | (JP) | 2020-138977 |

(58) Field of Classification Search
CPC ... B65F 1/1415; B65F 2210/18; B65F 1/1607
USPC .......... 24/20 R; 248/95
See application file for complete search history.

(56) References Cited

U.S. PATENT DOCUMENTS

| | | | | | |
|---|---|---|---|---|---|
| 497,870 | A * | 5/1893 | Fjellman | B65B 67/12 | 248/99 |
| 868,269 | A * | 10/1907 | Hulbert | B65F 1/1415 | 248/100 |
| 1,049,821 | A * | 1/1913 | Devini | B65F 1/1415 | 141/340 |
| 1,340,714 | A * | 5/1920 | Herrman | B65B 67/1255 | 248/99 |
| 1,461,802 | A * | 7/1923 | McRoberts | D06F 53/005 | 211/119.01 |
| 2,144,660 | A * | 1/1939 | Michel | B65B 67/1238 | 248/99 |
| 2,530,456 | A * | 11/1950 | Fracchia | A47G 7/047 | 248/318 |
| 3,180,384 | A * | 4/1965 | Seifert | B60N 3/08 | 383/23 |
| 3,532,314 | A * | 10/1970 | Vosbikian | B65B 67/1205 | 211/171 |
| 4,340,996 | A * | 7/1982 | Starace | B65D 63/02 | 24/23 EE |
| 5,082,219 | A * | 1/1992 | Blair | B65B 67/12 | 141/390 |
| 5,160,196 | A * | 11/1992 | Curtis | B65D 33/007 | 383/33 |
| 5,329,728 | A * | 7/1994 | Ray | A47G 7/047 | 248/318 |
| 5,344,109 | A * | 9/1994 | Hokoana, Jr. | B65F 1/1415 | 383/33 |
| 5,390,395 | A * | 2/1995 | Oetiker | B65D 63/02 | 24/20 R |
| 5,499,787 | A * | 3/1996 | Bonomo | B65B 67/1222 | 248/188 |
| 5,575,447 | A * | 11/1996 | Griffin | A47G 7/047 | 248/318 |
| 5,581,851 | A * | 12/1996 | Nagano | F16L 33/035 | 24/23 EE |
| 5,706,557 | A * | 1/1998 | Beicht | F16L 33/03 | 24/20 R |
| 6,086,022 | A * | 7/2000 | Dalton | B65F 1/1415 | 248/101 |
| 6,467,132 | B1 * | 10/2002 | Robley | B65D 63/1018 | 24/20 R |
| 6,473,943 | B1 * | 11/2002 | Thacker | F16L 33/03 | 24/20 R |
| 7,013,534 | B2 * | 3/2006 | Nagano | F16L 33/035 | 24/23 EE |
| 7,024,731 | B2 * | 4/2006 | Craig, Jr. | F16L 33/025 | 24/20 R |
| 7,721,393 | B2 * | 5/2010 | Craig, Jr. | F16L 33/025 | 24/20 R |
| D636,935 | S * | 4/2011 | Pilan | D28/41 | |
| 8,191,849 | B1 * | 6/2012 | Lembke | A47G 7/047 | 248/692 |
| 8,240,621 | B1 * | 8/2012 | Singh | B65D 25/16 | 220/495.11 |
| 8,353,416 | B2 * | 1/2013 | Mueller | B65F 1/1415 | 220/4.33 |
| 8,834,023 | B1 * | 9/2014 | Laera | B65B 67/1238 | 383/33 |
| 10,464,717 | B1 * | 11/2019 | Rosenshine | B65D 33/007 | |
| 11,338,951 | B1 * | 5/2022 | Hinkle | B65B 67/1238 | |
| 2001/0032911 | A1 * | 10/2001 | Gabl | B65B 67/1205 | 248/99 |
| 2005/0023417 | A1 * | 2/2005 | Burns | B65B 67/1238 | 248/99 |
| 2008/0017648 | A1 * | 1/2008 | Scott | B65F 1/06 | 220/495.06 |
| 2009/0046955 | A1 * | 2/2009 | Schember | B65D 33/007 | 383/33 |
| 2009/0151133 | A1 * | 6/2009 | Zhang | F16L 33/025 | 24/20 R |
| 2021/0298729 | A1 * | 9/2021 | Baril | A61B 10/02 | |
| 2022/0225844 | A1 * | 7/2022 | Biesinger | A47K 3/281 | |
| 2023/0415978 | A1 * | 12/2023 | Lapoussis | B65F 1/1415 | |

FOREIGN PATENT DOCUMENTS

| | | | | | |
|---|---|---|---|---|---|
| CN | 110406848 | A | * | 11/2019 | |
| DE | 20119688 | U1 | * | 7/2002 | B65F 1/141 |
| FR | 3110901 | A1 | * | 12/2021 | B65F 1/06 |
| JP | S43-10032 | Y1 | | 5/1968 | |
| JP | S50-104837 | U | | 8/1975 | |
| JP | S50-145654 | U | | 12/1975 | |
| JP | S51-159358 | U | | 12/1976 | |
| JP | S52-111219 | U | | 8/1977 | |
| JP | S52-145151 | A | | 12/1977 | |
| JP | S55110410 | | * | 5/1980 | B65B 67/12 |
| JP | S55-110410 | U | | 8/1980 | |
| JP | S56-80304 | U | | 6/1981 | |
| JP | S62-98507 | U | | 6/1987 | |
| JP | H06-52516 | U | | 7/1994 | |
| JP | H10-329905 | A | | 12/1998 | |
| JP | 2000007106 | A | * | 1/2000 | |
| JP | H1072101 | A | * | 11/2000 | |
| JP | 2002-167004 | A | | 6/2002 | |
| JP | 3089323 | U | | 10/2002 | |
| JP | 2002-326703 | A | | 11/2002 | |
| JP | 2003-292102 | A | | 10/2003 | |
| JP | 2004-051137 | A | | 2/2004 | |
| JP | 3122248 | U | | 6/2006 | |
| JP | 2006-316958 | A | | 11/2006 | |
| JP | 2014-503760 | A | | 2/2014 | |
| JP | 3210707 | U | | 6/2017 | |
| JP | 3217300 | U | | 8/2018 | |
| JP | 2019-166308 | A | | 10/2019 | |
| JP | 6717455 | B1 | * | 7/2020 | B65B 67/12 |
| KR | 101046880 | B1 | * | 7/2011 | B65B 67/1233 |
| WO | 89/01441 | A1 | | 2/1989 | |

OTHER PUBLICATIONS

Final Office Action issued in JP Appln. No. 2020-138977 Applicant: Minamoto Co., Ltd. dated Apr. 6, 2021.

Office Action issued in JP Appln. No. 2020-138977 Applicant: Minamoto Co., Ltd. dated Dec. 10, 2021.

Japanese Office Action dated Dec. 22, 2022 issued for corresponding JP Patent Appin. No. 2021-086335 & English Machine Translation.

* cited by examiner (A)

(B)

(A)

(B)

(A)

(B)

(A)

(B)

(A)

(B)

(C)

(A)

(B)

(A)

(B)

(A)

(B)

(A)

(B)

(A)

(B)

COLLECTING TOOL

PRIOR APPLICATIONS

The present application is a United States National application claiming priority to International Patent Application No. PCT/JP2020/041636 filed on Nov. 7, 2020, which claims priority to Japanese Patent Application No. 2019-215810 filed on Nov. 12, 2019, and to Japanese Patent Application No. 2019-240188 filed on Dec. 24, 2019 and to Japanese Patent Application No. 2020-097249 filed on May 1, 2020 and to Japanese Patent Application No. 2020-118078 filed on Jun. 15, 2020 and to Japanese Patent Application 2020-138977 filed on Jul. 29, 2020, the contents each of which are included in their entirety

TECHNICAL FIELD

The present invention relates to a collecting tool.

BACKGROUND ART

As a bag holder for using a resin bag having a pair of hanging handle portions as a dust container, a bag holder has been proposed in which a resin bag is hung from a hook provided on a wall face in a room, a top plate of furniture, or the like in a state where a mouth of the resin bag is opened (see, for example, Patent Literature 1). The bag holder includes a holder main body that has locking portions on both left and right sides and hangs the resin bag while holding a mouth of the resin bag in an open state by a pair of hanging handle portions being hooked on the locking portions, and a string, a wire, or the like that is hooked on the hook and hangs the holder main body.

CITATION LIST

Patent Literature

Patent Literature 1: JP 2004-51137 A

SUMMARY OF INVENTION

Technical Problem

However, the bag holder described in Patent Literature 1 can be applied only to a bag having a pair of hanging handle portions. Therefore, there is a demand for a technique for reusing a bag without a hanging handle portion as a dust container.

The present invention has been made in view of the above circumstances, and an object of the present invention is to provide a collecting tool capable of increasing variations of bags that can be used to collect waste.

Solution to Problem

In order to achieve the above object, a collecting tool according to the present invention includes a frame body that is disposed so as to surround an opening end portion of a bag that stores waste inside, and on which the opening end portion of the bag is hooked, and a clip that clamps the frame body and the opening end portion of the bag together in a state where the opening end portion of the bag is hooked on the frame body.

Advantageous Effects of Invention

According to the present invention, the frame body is disposed so as to surround the opening end portion of the bag storing the waste inside, and the opening end portion of the bag is hooked. The clip provided at one end portion of each of the plurality of wires in the longitudinal direction clamps the frame body and the opening end portion of the bag together in a state where the folded portion of the bag is hooked on the frame body. As a result, even a bag without a hanging handle portion can be used to collect waste, and thus, it is possible to increase a variation of the bag that can be used to collect waste.

DESCRIPTION OF EMBODIMENTS

First Embodiment

Hereinafter, a collecting tool according to an embodiment of the present invention will be described in detail with reference to the drawings. A collecting tool according to the present embodiment includes a frame body, a plurality of wires, a clip provided at one end portion of each of the plurality of wires in a longitudinal direction, and a fixing portion that supports the other end portion of each of the plurality of wires together and is fixed to a fixed portion. The frame body is disposed so as to surround the opening end portion of the bag storing the waste inside, and the folded portion of the opening end portion of the bag is hooked in a state where the opening end portion of the bag is folded outward. In addition, the clip clamps the frame body and the opening end portion of the bag together in a state where the folded portion of the bag is hooked on the frame body.

Figure 1:
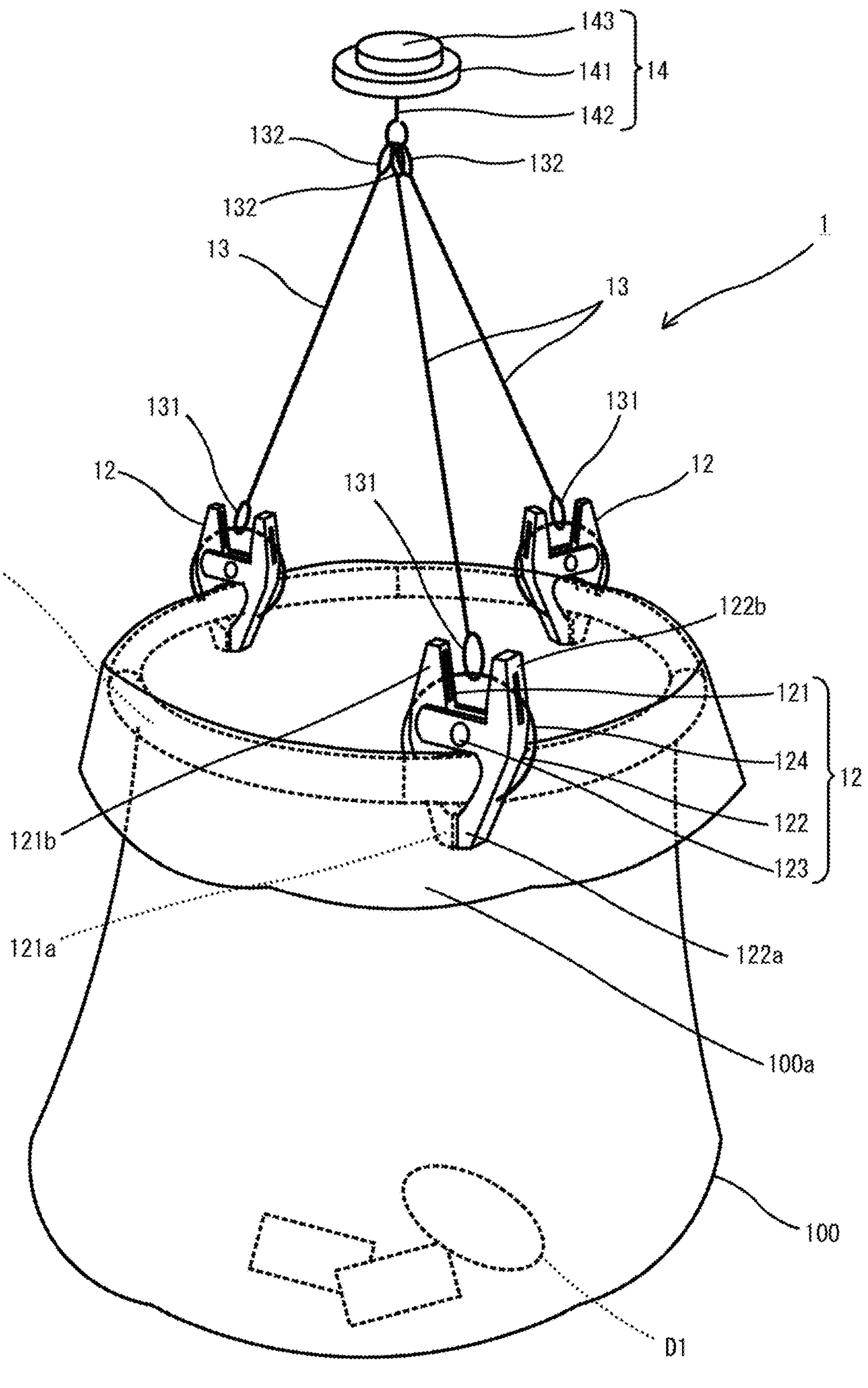
FIG. 1 is a perspective view of a collecting tool according to a first embodiment of the present invention.
Figure 2:
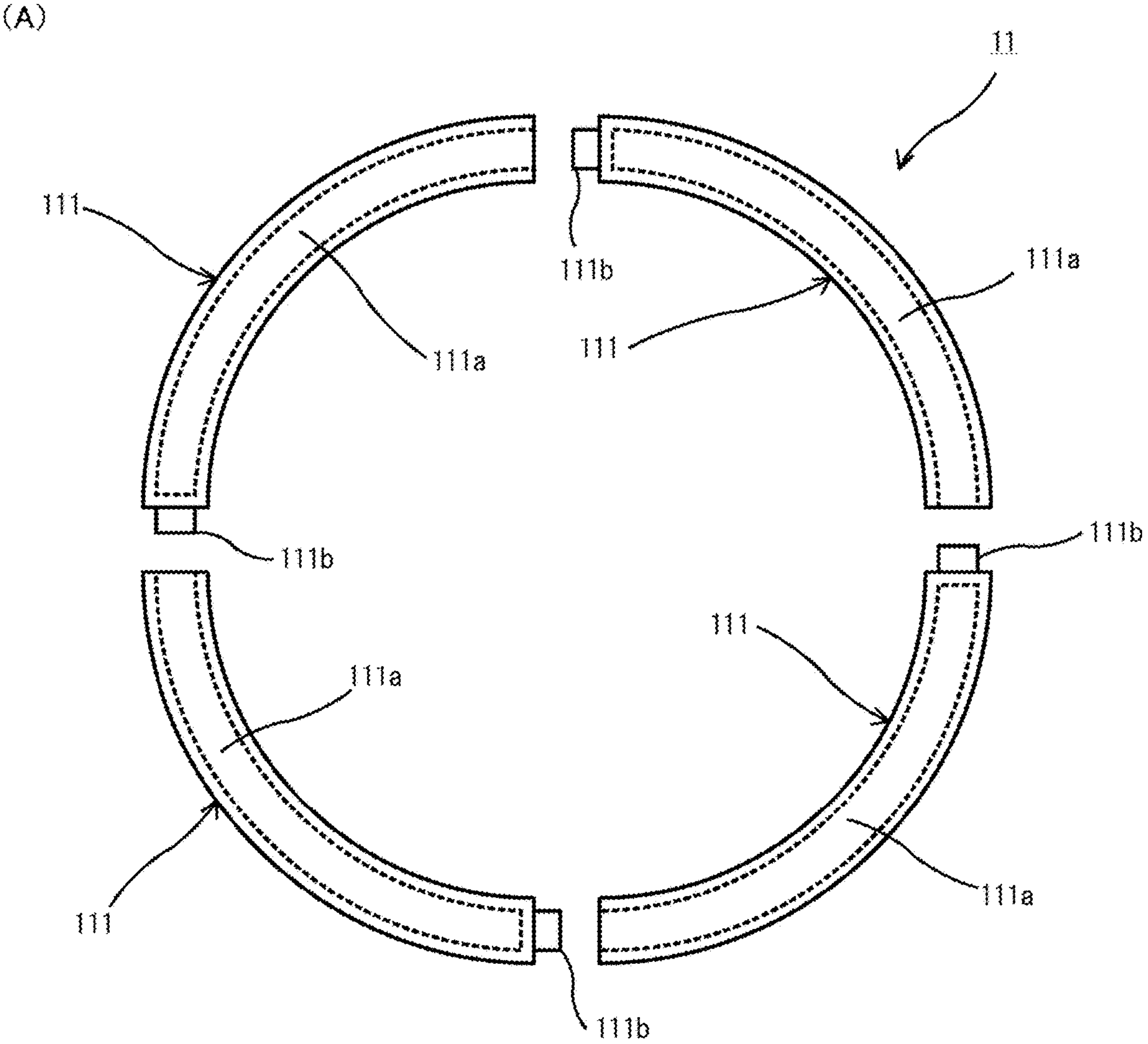
FIG. 2 illustrates a frame body according to the first embodiment, in which (A) is a plan view and (B) is a partially enlarged perspective view.
Figure 2:
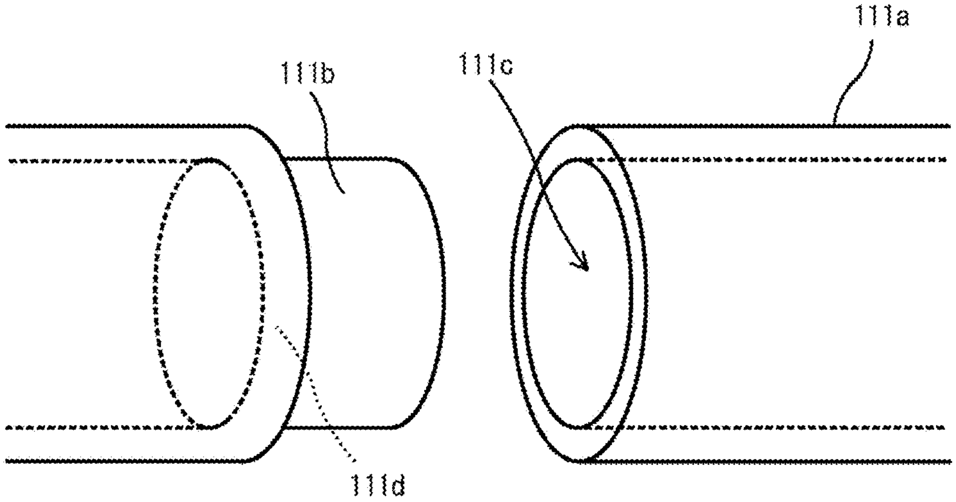

As illustrated in FIG. 1, a collecting tool 1 according to the present embodiment includes a bag 100 that stores waste D1 inside, a frame body 11, three wires 13, three clips 12, and a fixing portion 14. Examples of the waste D1 include expanded polystyrene discharged at a construction site of a building, an end material of a sponge, and the like. The object to be stored in the bag 100 is not limited to the waste, and may be, for example, a sheet for wrapping a product or the like, a packing string, or other articles other than the waste. The bag 100 is a bag formed of a polymer resin such as polyvinyl chloride, paper, or the like. The bag 100 may be, for example, a cloth bag. The frame body 11 is disposed so as to surround the opening end portion of the bag 100, and a folded portion 100*a* of the opening end portion of the bag is hooked in a state where the opening end portion of the bag 100 is folded outward. For example, as illustrated in FIG. 2(A), the frame body 11 includes a plurality of (four in FIG. 2(A)) tubular members 11I annularly disposed in parallel. Each of the four tubular members 111 is formed of flexible plastic, and includes a long main body 111*a* and a coupling portion 111*b* provided at one end portion of the main body 111*a* in the longitudinal direction. As shown in FIG. 2(B), the main body 111*a* has a long bottomed tubular shape, and the coupling portion 111*b* has a tubular outer shape and protrudes from a bottom wall 111*d* of the main body 111*a*. Here, the outer diameter of the coupling portion 111*b* is set to be substantially the same as the inner diameter of the main body 111*a*, and by being fitted into the inner side 111*c* of the adjacent main body 111*a* at one end of the main body 111*a* in the longitudinal direction, the two adjacent tubular members 111 are connected to each other.

Returning to FIG. 1, the wire 13 is, for example, a wire rope made of metal or resin, and has eyes 131 and 132 provided at both end portions in the longitudinal direction. The clip 12 includes two clamping pieces 121 and 122, a support shaft 123 that supports the two clamping pieces 121 and 122, and a ring spring 124 that biases the two clamping pieces 121 and 122 in a direction in which jaws 121*a* and 122*a* of the two clamping pieces 121 approach each other. A portion, of the ring spring 124, located between the two clamping pieces 121 and 122 is inserted into the eye 131 of the wire 13. Then, the gripping portions 121*b* and 122*b* of the two clamping pieces 121 and 122, respectively, are compressed by fingers (usually a thumb and an index finger) to open the jaws 121*a* and 122*a*. The three clips 12 are fixed to, for example, three places disposed at substantially equal intervals along the circumferential direction of the frame body 11. The three clips 12 clamp the frame body 11 and the opening end portion of the bag 100 together in a state where the folded portion 100*a* of the bag 100 is hooked on the frame body 11. As a result, the opening end portion of the bag 100 is fixed to the frame body 11.

The fixing portion 14 collectively supports the eye 132 of each of the three wires 13 and is fixed to the fixed portion. Here, examples of the fixed portion include construction materials such as a ceiling material and a wall material. The fixing portion 14 includes, for example, a flat main body 141, a hook 142 protruding to one side of the main body 141 in the thickness direction, and a permanent magnet 143 provided on the other end side of the main body 141 in the thickness direction and capable of being attracted to a metal member. As the permanent magnet 143, for example, a magnet having an attractive force corresponding to the allowable weight of the waste D1 stored in the bag 100 is used. An eye 132 of each of the three wires 13 is hooked to the hook 142.

The collecting tool 1 according to the present embodiment is used in a state in which the frame body 11 and the bag 100 are hung on a construction material by attracting the fixing portion 14 to a member such as a metal beam or an iron plate provided on the construction material such as a ceiling or a wall of the building under construction, for example, at a construction site of the building.

As described above, according to the collecting tool 1 of the present embodiment, the frame body 11 is disposed so as to surround the opening end portion of the bag 100 that stores the waste D1 inside, and the folded portion 100*a* of the opening end portion of the bag 100 is hooked in a state where the opening end portion of the bag 100 is folded outward. Then, the clip 12 provided on each of the three wires 13 clamps the frame body 11 and the opening end portion of the bag 100 together in a state where the folded portion 100*a* of the bag 100 is hooked on the frame body 11. As a result, even the bag 100 without the hanging handle portion can be used to collect the waste D1, so that it is possible to increase the variation of the bag 100 that can be used to collect the waste D1.

Second Embodiment

Figure 3:
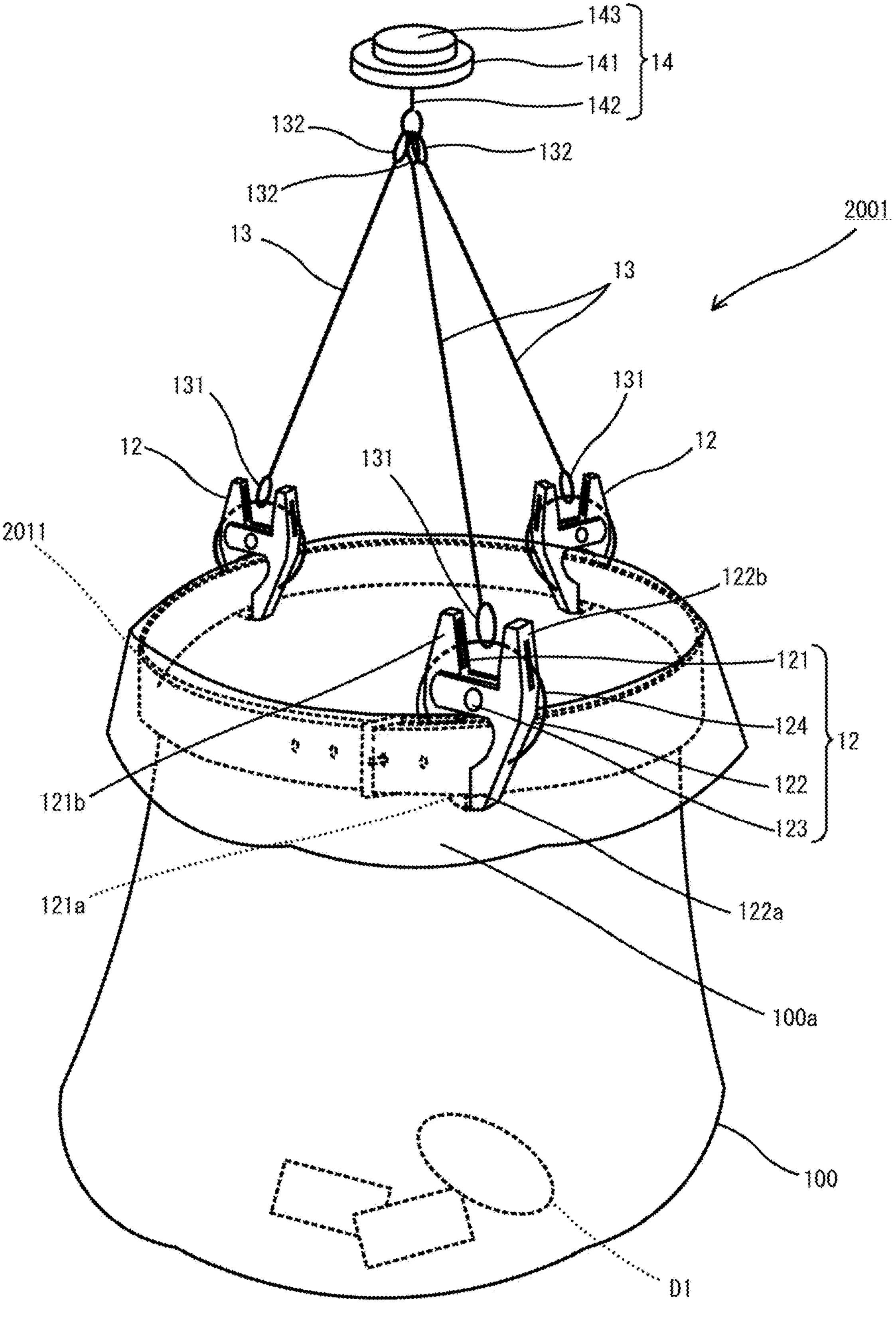
FIG. 3 is a perspective view of a collecting tool according to a second embodiment of the present invention.

The collecting tool according to the present embodiment includes a frame body including an elongated annularly curved plate member formed of a flexible material and a holder attached to one end portion of the plate member in the longitudinal direction and holding the other end portion of the plate member in the longitudinal direction. For example, as illustrated in FIG. 3, a collecting tool 2001 according to the present embodiment includes a frame body 2011. In FIG. 3, the components same as those in the first embodiment are denoted by the reference numerals same as those in FIG. 1. Here, the jaws 121*a* and 122*a* of the two clamping pieces 121 and 122 of the clip 12 clamp the portion where the frame body 2011 and the bag 100 overlap from both sides of the frame body 2011 in the thickness direction.

Figure 4:
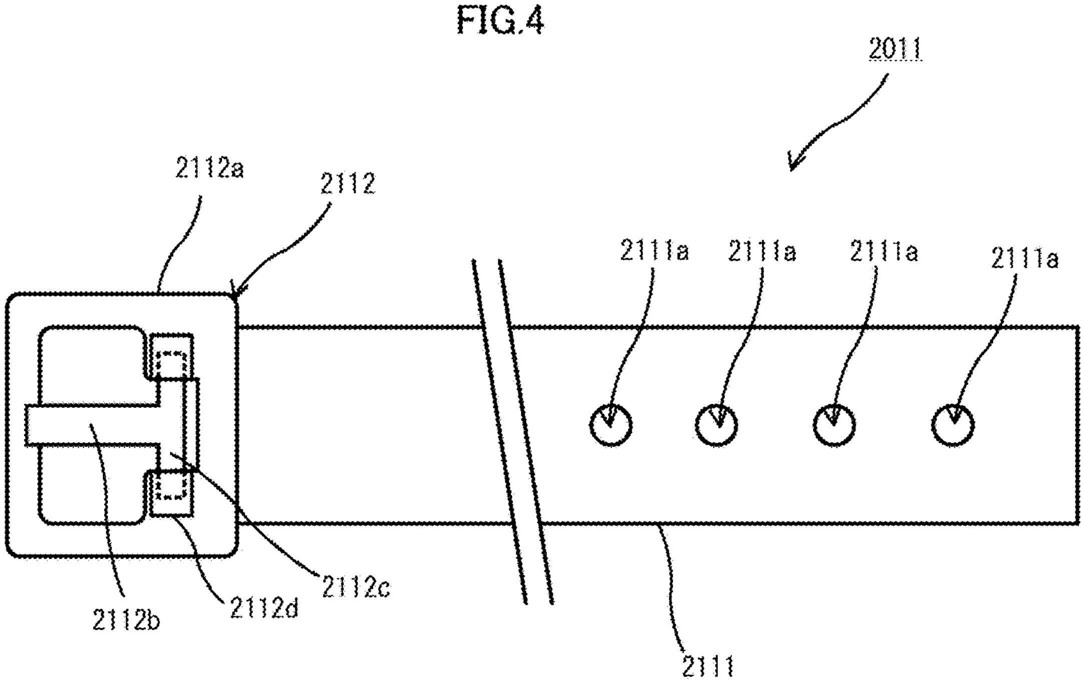
FIG. 4 illustrates a frame body according to the second embodiment, in which (A) is a partial plan view, and (B) is a plan view.
Figure 4:
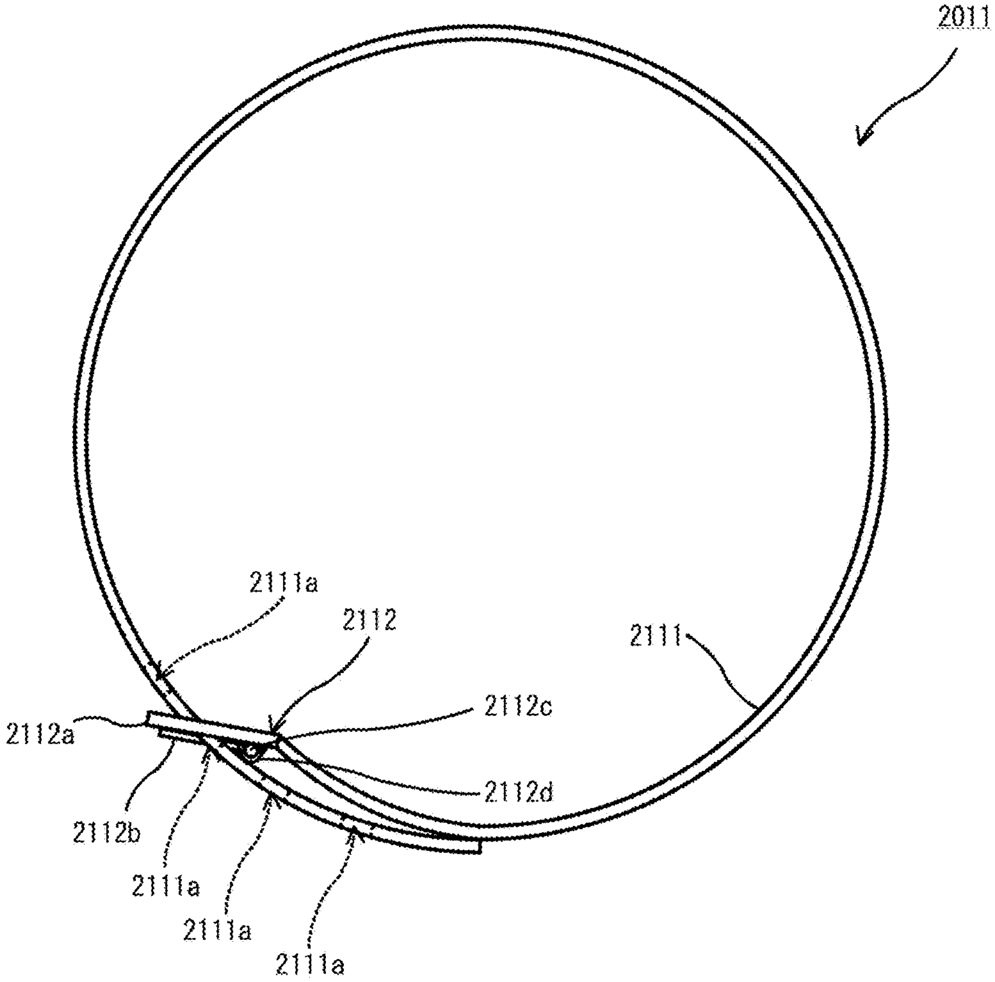

As illustrated in FIG. 4(A), the frame body 2011 includes an elongated annularly curved plate member 2111 formed of a flexible material, and a holder 2112 attached to one end portion of the plate member 2111 in the longitudinal direction and holding the other end portion of the plate member 2111 in the longitudinal direction. The plate member 2111 is formed of resin, paper, or the like, and has a plurality of (four in FIG. 4(A)) holes 2111*a* penetrating the plate member 2111 in the thickness direction in parallel along the longitudinal direction at the other end portion in the longitudinal direction (the right end in FIG. 4(A)). The holder 2112 is made of metal, resin, or the like, and includes a rectangular frame-shaped main body 2112*a*, a pin 2112*b* disposed to overlap the main body 2112*a*, a shaft 2112*c* formed continuously and integrally with the pin 2112*b*, and a support 2112*d* that pivotally supports the shaft 2112*c*. Then, as illustrated in FIG. 4(B), the holder 2112 holds the end portion, of the plate member 2111, away from the holder 2112 by inserting the pin 2112*b* into any of the holes 2111*a* of the plate member 2111 in a state where the plate member 2111 is curved annularly.

According to the collecting tool 2001 of the present embodiment, since the end portion of the plate member 2111 is fixed by the pin 2112*b*, the shape of the frame body 2011 can be stabilized.

Third Embodiment

Figure 5:
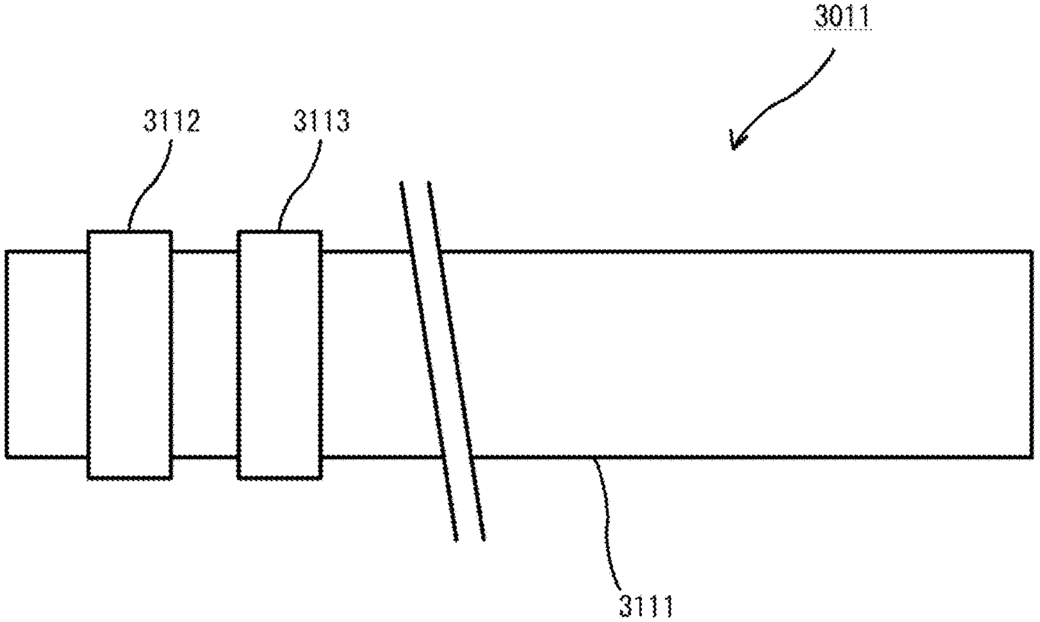
FIG. 5 illustrates a frame body according to a third embodiment, in which (A) is a partial plan view, and (B) is a plan view.
Figure 5:
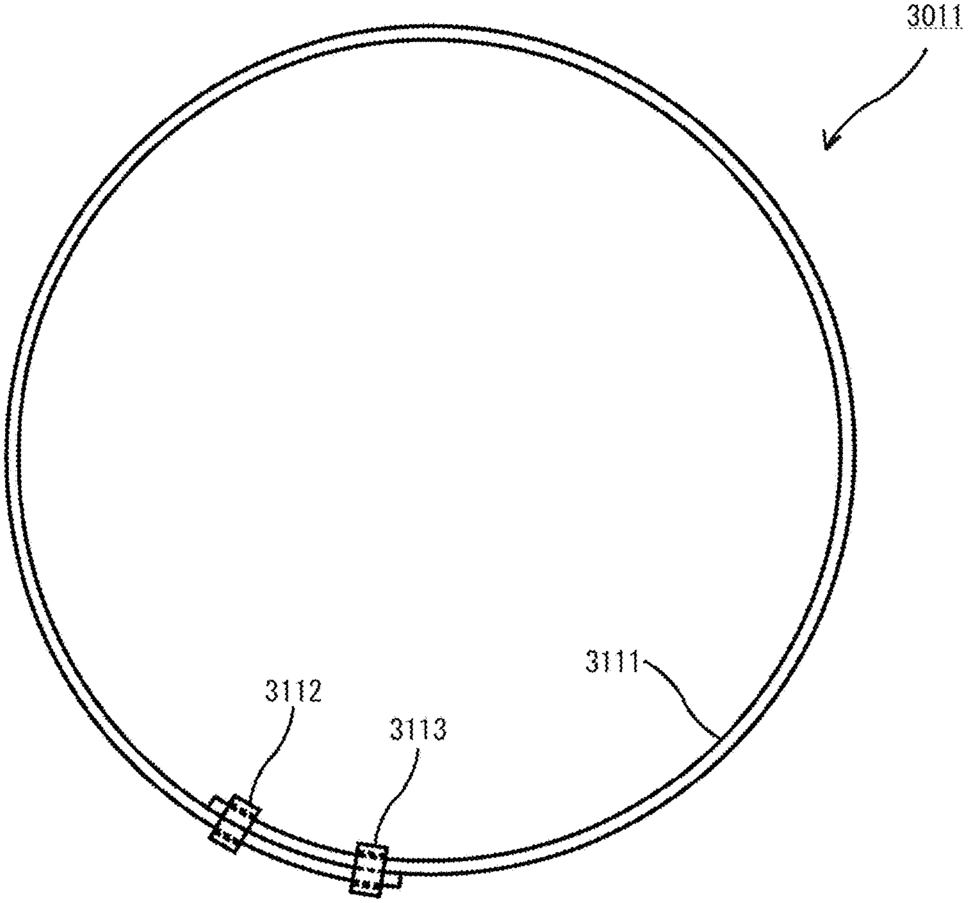

The collecting tool according to the present embodiment includes a frame body including an elongated annularly curved plate member formed of a flexible material and two annular holders attached to one end portion of the plate member in the longitudinal direction and holding the other end portion of the plate member in the longitudinal direction, in which the holder slidably holds the end portion of the plate member. For example, as illustrated in FIGS. 5(A) and 5(B), a frame body 3011 according to the present embodiment includes an elongated annularly curved plate member 3111 formed of a flexible material, and two annular holders 3112 and 3113 attached to one end portion of the plate member 3111 in the longitudinal direction and holding the other end portion of the plate member 3111 in the longitudinal direction. The plate member 3111 is formed of resin, paper, or the like, as in the plate member 2111 according to the second embodiment. As the resin, for example, polyvinyl chloride (PVC) can be used. The thickness of the plate member 3111 can be set to, for example, about 1.5 mm. The holder 3112 is formed in an annular shape from resin, paper, or the like, and part thereof is fixed to the above-described one end portion of the plate member 3111. Then, as illustrated in FIG. 5(B), the holders 3112 and 3113 hold the other end portion, of the plate member 3111 inserted inside, away from the holders 3112 and 3113 in a state where the plate member 3111 is curved in an annular shape. Note that the number of annular holders provided on the plate member 3111 is not limited to two, and may be only one or three or more. In addition, at least the vicinity of both end portions of the plate member 3111 may be subjected to surface treatment such that frictional resistance decreases in a state where the end portion toward the holders 3112 and 3113 and the other end portion away from the holders 3112 and 3113 are in contact with each other.

Here, a method of using the collecting tool according to the present embodiment will be described. First, in a state where the end portion of the plate member 3111 is held such that the area inside the frame body 3011 is smaller than the area of the opening of the bag 100, the opening end portion of the bag 100 is inserted into the frame body 3011 and the opening end portion of the bag 100 is folded back to the outside of the frame body 3011. Then, the folded portion 100*a* of the bag 100 is disposed outside the frame body 3011. Next, when the end portion of the plate member 3111 of the frame body 3011 is released, the inner area of the frame body 3011 is deformed to be increased by the restoring force of the plate member 3111, and the folded portion 100*a* of the bag 100 is pressed from the inner side. Then, the holder 3113 is disposed at a position where the holder covers the end portion, of the plate member 3111, away from the holder 3112. In this manner, the bag 100 is firmly fixed to the frame body 3011.

In addition, as another method of using the collecting tool according to the present embodiment, first, in a state where the end portion of the plate member 3111 is held such that the area inside the frame body 3011 is smaller than the area of the opening of the bag 100, the frame body 3011 is disposed inside the opening end portion of the bag 100, and the opening end portion of the bag 100 is folded back to the inside of the frame body 3011. The opening end portion of the bag 100 may not be folded back. Next, when the end portion of the plate member 3111 of the frame body 3011 is released, the inner area of the frame body 3011 is deformed to be increased by the restoring force of the plate member 3111, and the opening end portion of the bag 100 is pressed from the inner side. Then, the holder 3113 is disposed at a position where the holder covers the end portion, of the plate member 3111, away from the holder 3112.

The frame body 3011 according to the present embodiment can be used while periodically changing the curving direction of the plate member 3111, so that the restoring force of the plate member 3111 can be maintained for a long period of time. Therefore, at the time of use, the force of pressing the folded portion 100*a* or the opening end portion of the bag 100 from the inside by the frame body 3011 can be maintained for a long period of time.

Fourth Embodiment

Figure 6:
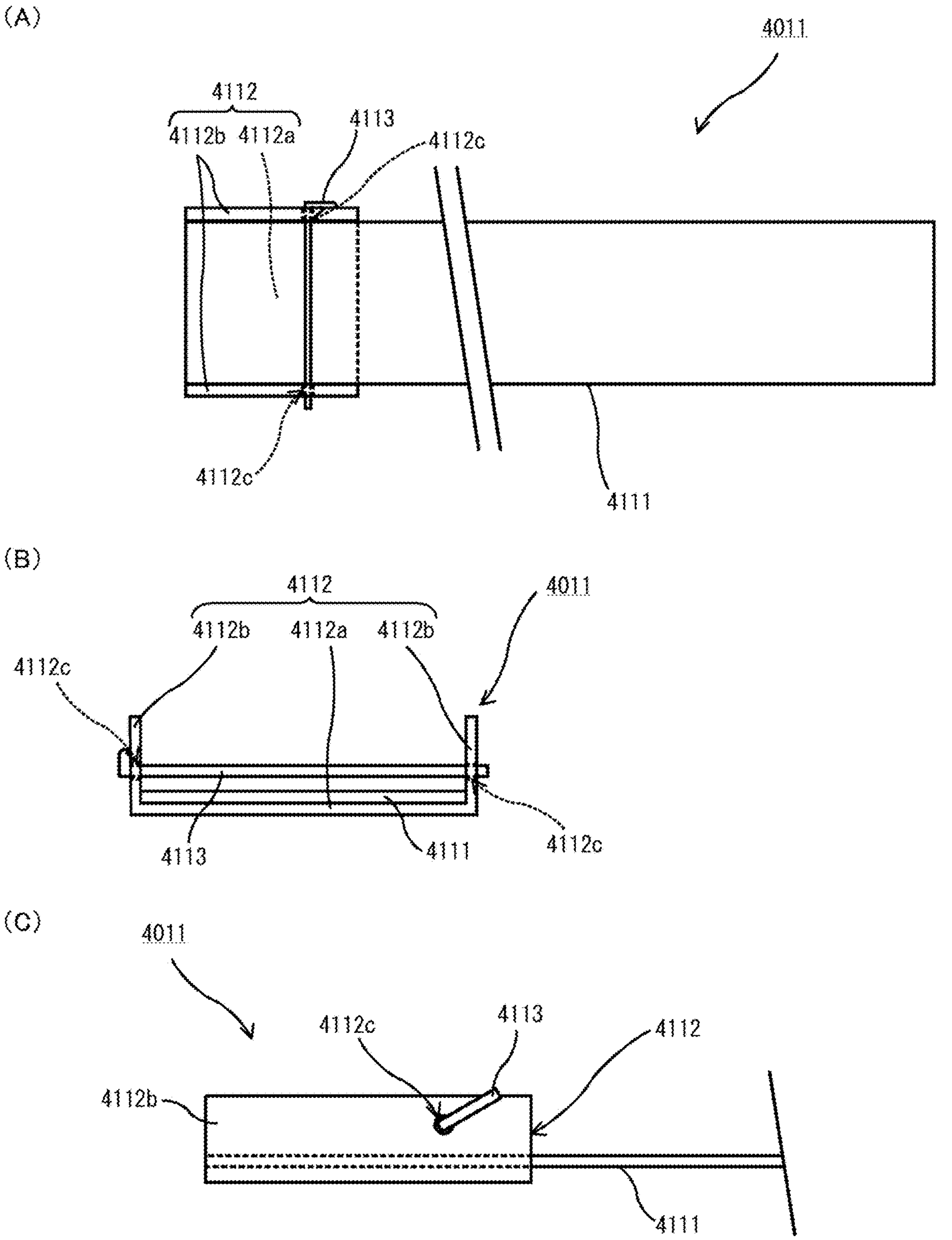
FIG. 6 illustrates a frame body according to a fourth embodiment of the present invention, in which (A) is a partial plan view, (B) is a side view, and (C) is a partial side view when viewed from another direction.

The collecting tool according to the present embodiment includes an elongated plate member formed of a flexible material, a holder having a U-shaped cross section attached to one end of the plate member in a longitudinal direction, and a pin attached to the holder. For example, as illustrated in FIGS. 6(A) to 6(C), a frame body 4011 according to the present embodiment includes an elongated plate member 4111 formed of a flexible material, a holder 4112 attached to one end of the plate member 4111 in the longitudinal direction, and an L-shaped pin 4113 attached to the holder 4112. The plate member 4111 is formed of resin, paper, or the like, as in the plate member 2111 described above. The holder 4112 has a rectangular plate-like main piece 4112*a* fixed to the plate member 4111, and two rectangular plate-like extension pieces 4112*b* extending in the same direction along the thickness direction of the main piece 4112*a* from both sides of the main piece 4112*a* in the short direction. The main piece 4112*a* and the extension pieces 4111*b* are continuously and integrally formed. Each of the two extension pieces 4112*b* is provided with a through hole 4112*c* penetrating in the thickness direction. The L-shaped pin 4113 is inserted into the through hole 4112*c* provided in each of the two extension pieces 4112*b*.

Figure 7:
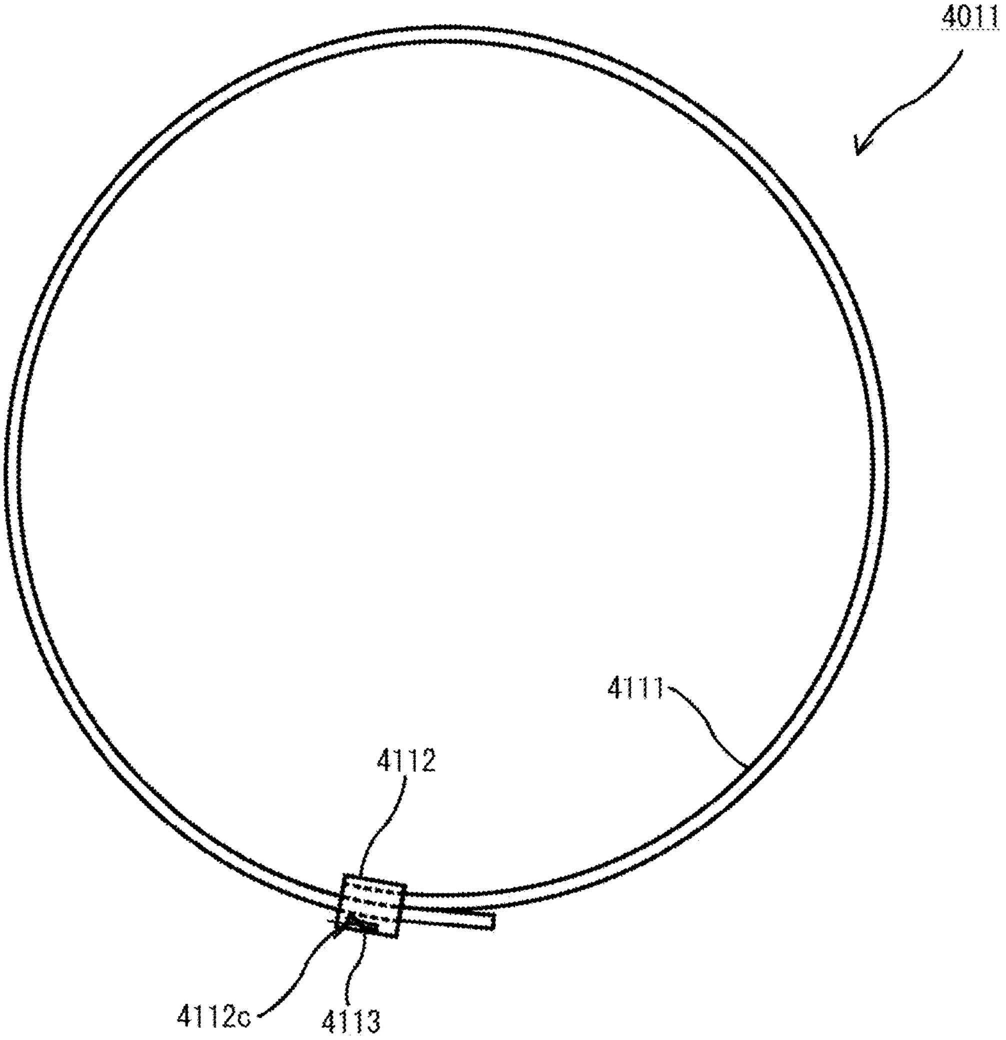
FIG. 7 is a plan view of a frame body according to the fourth embodiment.

As illustrated in FIG. 7, in a state where the plate member 4111 is curved in an annular shape, the L-shaped pin 4113 is inserted into the through hole 4111*c* of the extension piece 4111*b* in a state where the other end portion, of the plate member 4111, away from the holder 4112 is disposed inside the holder 4112, whereby the end portion of the plate member 4111 is held by the holder 4112. Note that the L-shaped pin 4113 may be covered with, for example, an elongated tubular member (not illustrated). In this case, the tubular member is preferably made of, for example, polytetrafluoroethylene (PTFE).

Here, a method of using the collecting tool according to the present embodiment will be described. First, in a state where the end portion of the plate member 4111 is held such that the area inside the frame body 4011 is smaller than the area of the opening of the bag 100, the opening end portion of the bag 100 is inserted into the frame body 4011 and the opening end portion of the bag 100 is folded back to the outside of the frame body 4011. Then, the folded portion 100*a* of the bag 100 is disposed outside the frame body 4011. Next, when the end portion of the plate member 4111 of the frame body 4011 is released, the inner area of the frame body 4011 is deformed to be increased by the restoring force of the plate member 4111, and the folded portion 100*a* of the bag 100 is pressed from the inner side. In this manner, the bag 100 is firmly fixed to the frame body 4011.

In addition, as another method of using the collecting tool according to the present embodiment, first, in a state where the end portion of the plate member 4111 is held such that the area inside the frame body 4011 is smaller than the area of the opening of the bag 100, the frame body 4011 is disposed inside the opening end portion of the bag 100 and the opening end portion of the bag 100 is folded back to the inside of the frame body 4011. The opening end portion of the bag 100 may not be folded back. Next, when the end portion of the plate member 4111 of the frame body 4011 is released, the inner area of the frame body 4011 is deformed to be increased by the restoring force of the plate member 4111, and the opening end portion of the bag 100 is pressed from the inner side.

Fifth Embodiment

Figure 8:
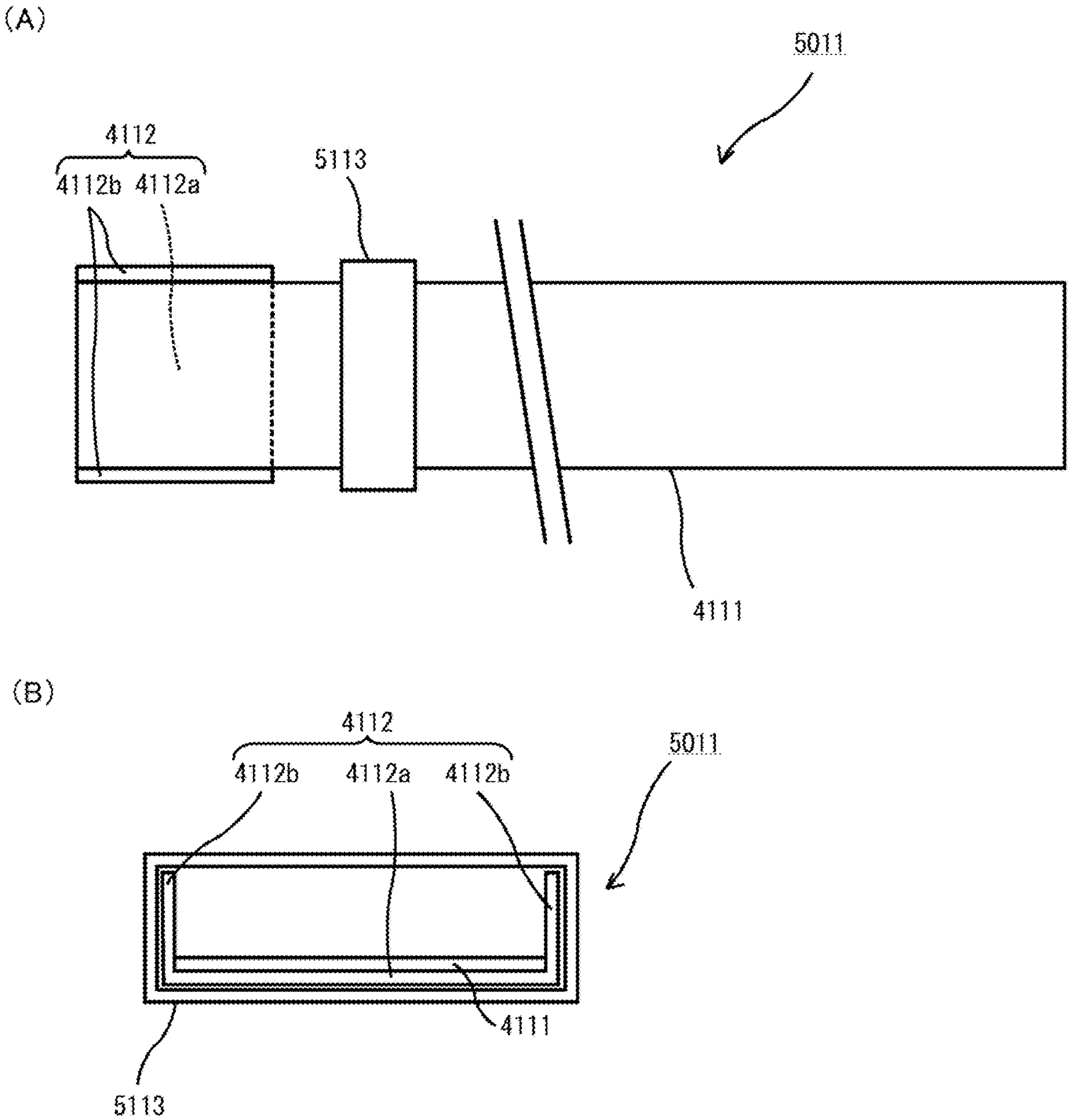
FIG. 8 illustrates a frame body according to a fifth embodiment of the present invention, in which (A) is a partial plan view, and (B) is a side view.

The collecting tool according to the present embodiment includes a frame body including an elongated plate member formed of a flexible material, a first holder having a U-shaped cross section attached to one end of the plate member in a longitudinal direction, and an annular second holder. For example, as illustrated in FIGS. 8(A) and 8(B), a frame body 5011 according to the present embodiment includes a holder 4112 described in the fourth embodiment and an annular holder 5113. In FIGS. 8(A) and 8(B), the components same as those in the fourth embodiment are denoted by the reference numerals same as those in FIGS. 6(A) and 6(B). The holder 5113 is formed in an annular shape from resin, paper, or the like, and is formed in a size into which the holder 4112 is inserted inside as illustrated in FIG. 8(B). Then, in a state in which the plate member 4111 is curved in an annular shape, the holder 5113 is disposed at a position to cover the end portion, of the plate member 4111, away from the holder 4112 in a state in which a portion in the vicinity of the other end portion, of the plate member 4111, away from the holder 4112 is disposed inside the holder 4112, whereby the end portion of the plate member 4111 is held by the holders 4112 and 5113.

Here, a method of using the collecting tool according to the present embodiment will be described. First, in a state where the end portion of the plate member 4111 is held such that the area inside the frame body 5011 is smaller than the area of the opening of the bag 100, the opening end portion of the bag 100 is inserted into the frame body 5011 and the opening end portion of the bag 100 is folded back to the outside of the frame body 5011. Then, the folded portion 100*a* of the bag 100 is disposed outside the frame body 5011. Next, when the end portion of the plate member 4111 of the frame body 5011 is released, the inner area of the frame body 5011 is deformed to be increased by the restoring force of the plate member 4111, and the folded portion 100*a* of the bag 100 is pressed from the inner side. Then, the holder 5113 is disposed at a position where the holder covers the end portion, of the plate member 4111, away from the holder 4112. In this manner, the bag 100 is firmly fixed to the frame body 5011.

In addition, as another method of using the collecting tool according to the present embodiment, first, in a state where the end portion of the plate member 4111 is held such that the area inside the frame body 5011 is smaller than the area of the opening of the bag 100, the frame body 5011 is disposed inside the opening end portion of the bag 100, and the opening end portion of the bag 100 is folded back to the inside of the frame body 5011. The opening end portion of the bag 100 may not be folded back. Next, when the end portion of the plate member 4111 of the frame body 5011 is released, the inner area of the frame body 5011 is deformed to be increased by the restoring force of the plate member 4111, and the opening end portion of the bag 100 is pressed from the inner side. Then, the holder 5113 is disposed at a position where the holder covers the end portion, of the plate member 4111, away from the holder 4112.

Sixth Embodiment

Figure 9:
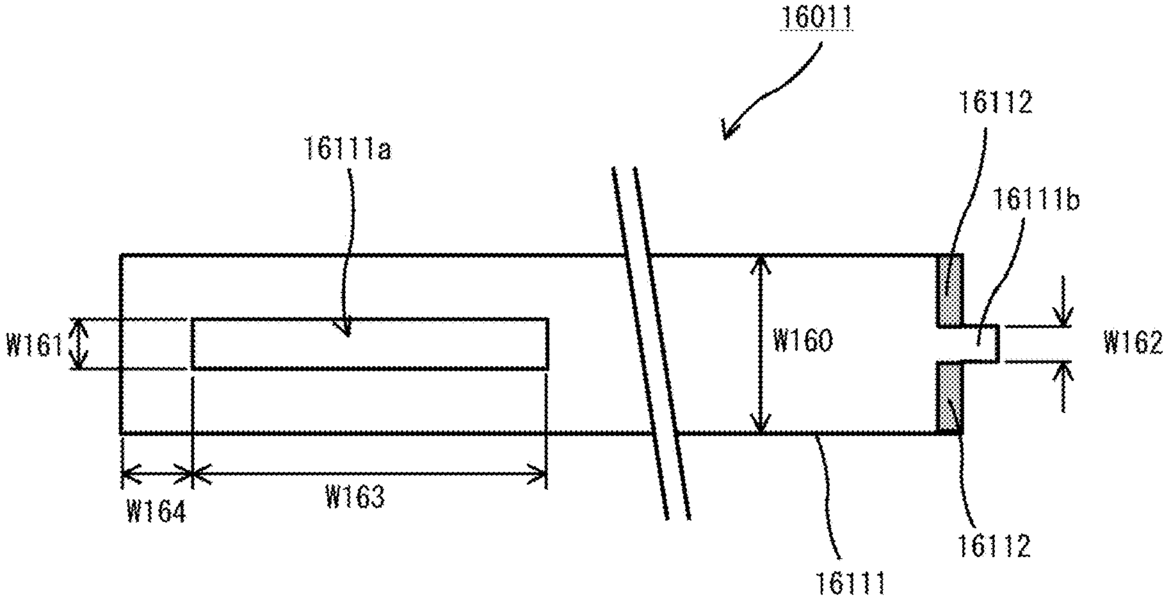
FIG. 9 illustrates a frame body according to a sixth embodiment of the present invention, in which (A) is a partial plan view, and (B) is a perspective view.
Figure 9:
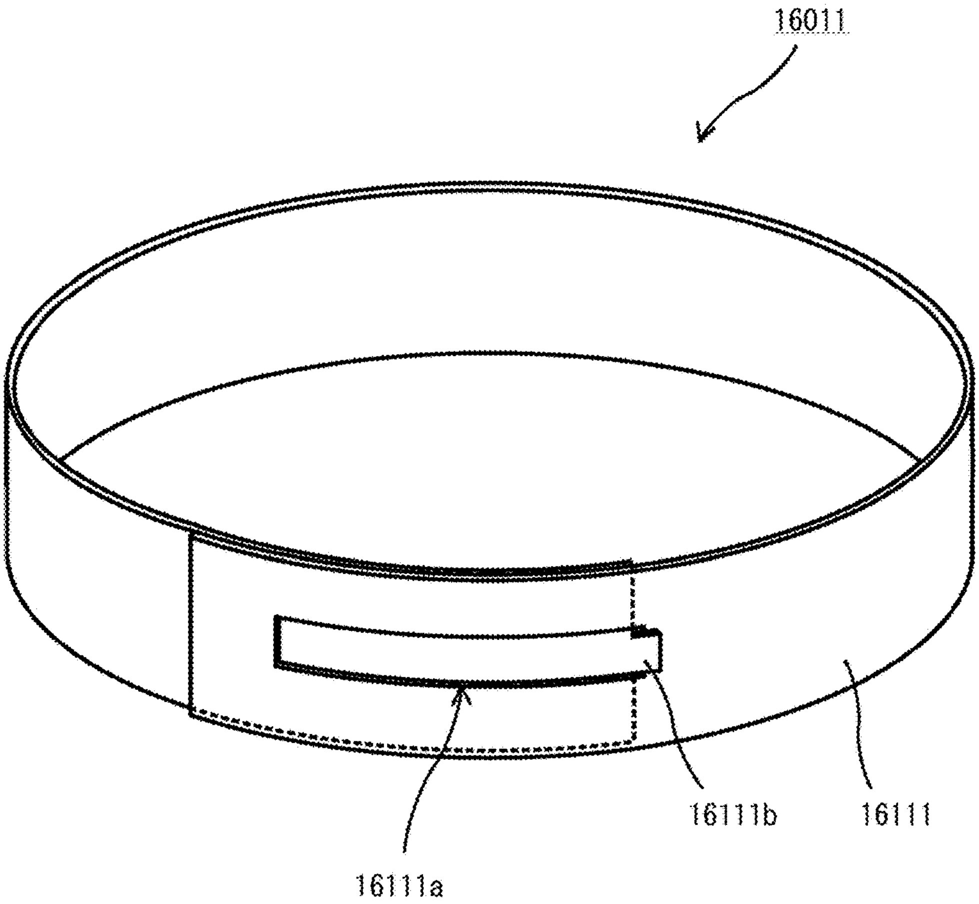

The collecting tool according to the present embodiment includes a frame body including a plate member that is formed elongated from a flexible material, that has a slit bored at one end portion in the longitudinal direction along the longitudinal direction, and that has a rectangular plate-shaped tongue piece portion extending from the other end portion in the longitudinal direction. For example, as illustrated in FIGS. 9(A) and 9(B), a frame body 16011 according to the present embodiment includes a plate member 16111 having an elongated rectangular plate shape and a sliding member 16112. The plate member 16111 has a slit 16111*a* bored at one end in the longitudinal direction along the longitudinal direction, and a tongue piece portion 16111*b* extending therefrom at the other end portion in the longitudinal direction. The plate member 16111 is formed of resin, paper, or the like, and a width W160 in the short direction is set to, for example, about 45 mm to 55 mm. The slit 16111*a* is located at a substantially central portion of the plate member 16111 in the short direction, and the width W161 in the short direction is set to 9 mm to 11 mm, that is, about 20% of the width of the plate member 16111 in the short direction. The length W163 of the slit 16111*a* in the longitudinal direction is set to, for example, about 245 mm to 255 mm when the length of the plate member 16111 in the longitudinal direction is 1 m. A length W164 from an end edge, of the slit 16111*a*, away from the tongue piece portion 16111*b* to an end edge, of the plate member 16111, away from the tongue piece portion 16111*b* is set to, for example, 90 mm to 110 mm. A width W162 of the tongue piece portion 16111*b* is set to be shorter than the width W161 of the slit 16111*a*, for example, about 8 mm.

The sliding member 16112 is provided at the end portion of the plate member 16111 toward the tongue piece portion 16111*b*, and is made of, for example, a tape formed of a material containing polytetrafluoroethylene (PTFE) or super-high-molecular polyethylene as a main component. When the sliding member 16112 is a tape formed of a tape material containing super-high-molecular polyethylene as a main component, for example, a "Saxin New Light" (registered trademark) adhesive tape manufactured by Saxin Corporation can be used.

As illustrated in FIG. 9(B), the frame body 16011 is formed by fitting the tongue piece portion 16111*b* into the slit 16111*a* of the plate member 16111 from the inside in a state where the plate member 16111 is curved annularly.

Here, a method of using the collecting tool according to the present embodiment will be described. First, the plate member 16111 is curved to fit the tongue piece portion 16111*b* into the slit 16111*a* from the inside, and the end portion of the plate member 16111 is gripped such that the area inside the plate member 16111 is smaller than the area of the opening of the bag 100 (see FIG. 1). Next, the opening end portion of the bag 100 is inserted into the inside of the frame body 16011, and the opening end portion of the bag 100 is folded back to the outside of the frame body 16011, so that the folded portion 100*a* (see FIG. 1) of the bag 100 is disposed outside the frame body 16011. Then, when the end portion of the plate member 16111 of the frame body 16011 is released, the tongue piece portion 16111*b* moves in the slit 16111*a* by the restoring force of the plate member 16111 and is deformed so as to expand the area inside the frame body 16011, and the folded portion 100*a* of the bag 100 is pressed from the inside. In this manner, the bag 100 is firmly fixed to the frame body 16011.

As another method of using the collecting tool according to the present embodiment, first, the plate member 16111 is curved and the tongue piece portion 16111*b* is fitted into the slit 16111*a* from the inside, and the end portion of the plate member 16111 is gripped such that the area of the inside of the plate member 16111 is smaller than the area of the opening of the bag 100. Next, the frame body 16011 is disposed inside the opening end portion of the bag 100, and the opening end portion of the bag 100 is folded back to the inside of the frame body 16011. The opening end portion of the bag 100 may not be folded back. Next, when the end portion of the plate member 16111 of the frame body 16011 is released, the inner area of the frame body 16011 is deformed to be increased by the restoring force of the plate member 16111, and the opening end portion of the bag 100 is pressed from the inner side.

The frame body 16011 according to the present embodiment can be used while periodically changing the curving direction of the plate member 16111, so that the restoring force of the plate member 16111 can be maintained for a long period of time. Therefore, at the time of use, the force of pressing the folded portion 100*a* or the opening end portion of the bag 100 from the inside by the frame body 16011 can be maintained for a long period of time.

Seventh Embodiment

The collecting tool according to the present embodiment includes a frame body that is disposed so as to surround an opening end portion of a duct formed in a tubular shape from a flexible resin material and on which the opening end portion of the duct is hooked.

Figure 10:
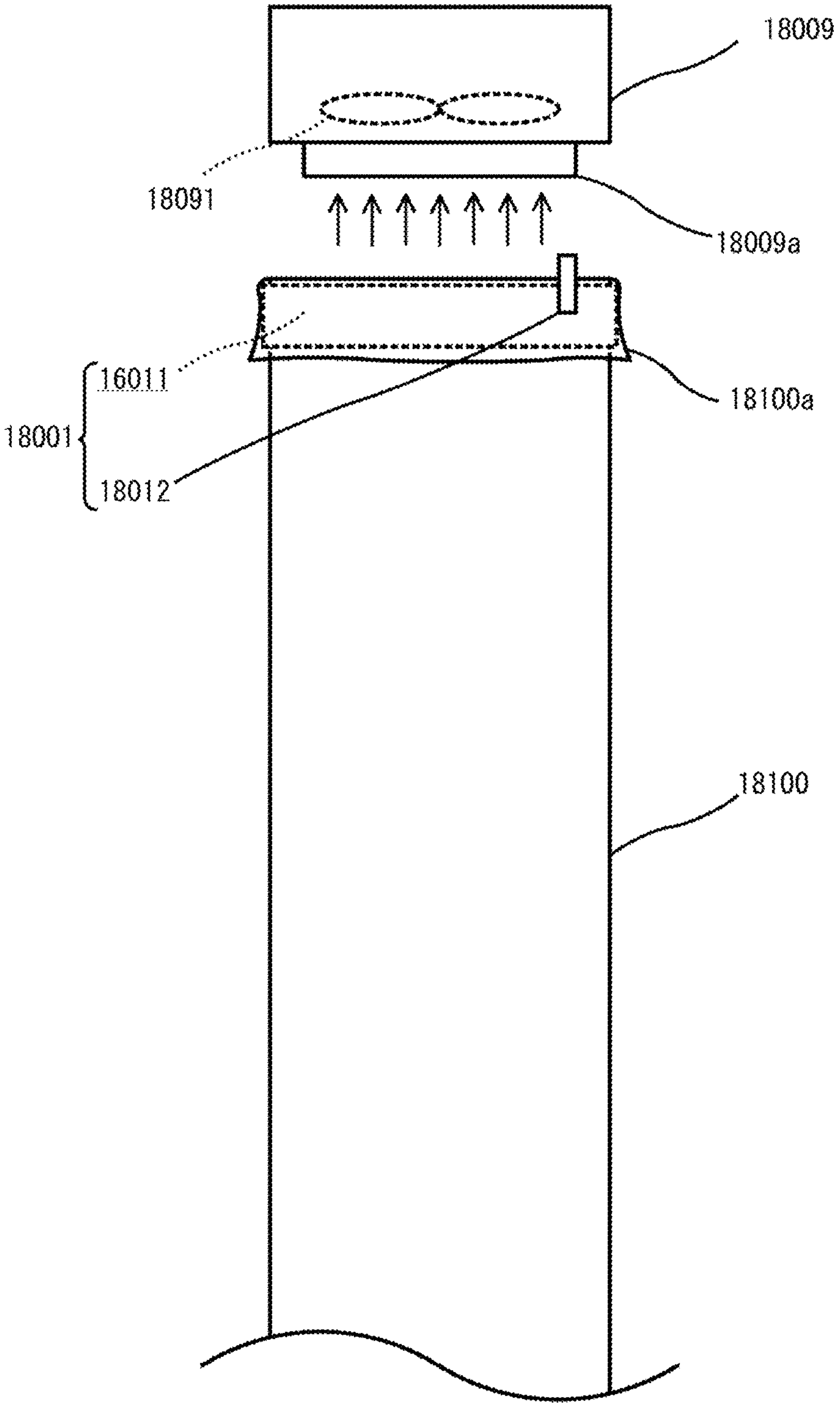
FIG. 10 is a schematic configuration diagram of a collecting tool according to a seventh embodiment of the present invention.

As illustrated in FIG. 10, a collecting tool 18001 according to the present embodiment includes a frame body 16111 described in the sixth embodiment, and a clip 18012 for fixing the frame body 16011 to a duct 18100. The frame body 16001 is the same as the frame body 16001 described in the sixth embodiment. The duct 18100 is a flexible tubular sheet made of a resin material such as polyethylene. As illustrated in FIG. 9(B), first, in the collecting tool 18001, the plate member 16111 is curved to fit the tongue piece portion 16111*b* into the slit 16111*a* from the inside, and the end portion of the plate member 16111 is gripped such that the area inside the plate member 16111 is smaller than the area of the opening of the duct 18100. Next, the opening end portion of the duct 18100 is inserted into the frame body 16011, and the opening end portion of the duct 18100 is folded back to the outside of the frame body 16011, so that a folded portion 18100*a* of the duct 18100 is disposed outside the frame body 16011. When the end portion of the plate member 16111 of the frame body 16011 is released, the tongue piece portion 16111*b* moves in the slit 16111*a* by the restoring force of the plate member 16111 and is deformed so as to expand the area inside the frame body 16011, and the folded portion 18100*a* of the duct 18100 is pressed from the inside. In this way, the duct 18100 is firmly fixed to the frame body 16011. The clip 18012 clamps the frame body 16011, the folded portion 18100*a* of the duct 18100, and the proximal end portion of the folded portion 18100*a* of the duct 18100. The clip 18012 may be omitted when the duct 18100 is sufficiently firmly fixed to the frame body 16011 without the clip 18012 attached.

As another method of attaching the duct 18100 to the collecting tool 18001 according to the present embodiment, first, the plate member 16111 is curved to fit the tongue piece portion 16111*b* into the slit 16111*a* from the inside, and the end portion of the plate member 16111 is gripped such that the area inside the plate member 16111 is smaller than the area of the opening end portion of the duct 18100. Next, the frame body 16011 is disposed inside the opening end portion of the duct 18100, and the opening end portion of the duct 18100 is folded back to the inside of the frame body 16011. The opening end portion of the duct 18100 may not be folded back. Next, when the end portion of the plate member 16111 of the frame body 16011 is released, the inner area of the frame body 16011 is deformed to be increased by the restoring force of the plate member 16111, and the opening end portion of the duct 18100 is pressed from the inner side.

The duct 18100 is used in a state where an opening end portion hooked on the frame body 16011 is disposed near a suction port 18009*a* of a vacuum cleaner 18009 for business use. Then, an intake fan 18091 of the vacuum cleaner 18009 generates a flow of air in the duct 18100 to collect waste into the duct 18100.

Although the embodiments of the present invention is described above, the present invention is not limited to the configuration of the above-described embodiments. For example, as illustrated in FIGS. 11(A) to (C), a frame body 6011 may include an elongated plate member 6111 in which an arc-shaped cutout portion 6111*a* is formed at a distal end portion formed of a flexible material, and a holder 6112 attached to one end of the plate member 6111 in the longitudinal direction. The holder 6112 includes a main piece 6112*a* having a rectangular plate shape and fixed to the plate member 6111, two rectangular plate-shaped extension pieces 6112*b* extending in the same direction along the thickness direction of the main piece 6112*a* from both sides of the main piece 6112*a* in the short direction, and a cover piece 6112*c* bridged between one end portions of the two extension pieces 6112*b* in the longitudinal direction. The main piece 6112*a*, the extension pieces 6112*b*, and the cover piece 6112*c* are continuously and integrally formed. In this case, in a state where the plate member 6111 is curved in an annular shape, the other end portion, of the plate member 6111, away from the holder 6112 is held by the holder 6112 in a state where the other end portion, of the plate member 6111, away from the holder 6112 is inserted into a portion surrounded by the main piece 6112*a*, the extension pieces 6112*b*, and the cover piece 6112*c* of the holder 6112. At this time, since the arc-shaped cutout portion 6111*a* is provided at one end portion of the plate member 6111 toward the holder 6112, a contact area between one end portion of the plate member 6111 toward the holder 6112 and the other end portion away from the holder 6112 can be reduced in a state where the other end portion, of the plate member 6111, away from the holder 6112 is held by the holder 6112, and a frictional force generated between these end portions can be reduced. Therefore, when the frame body 6011 is deformed so that the area inside the frame body changes, the other end portion away from the holder 6112 can be smoothly slid with respect to the one end portion, of the plate member 6111, toward the holder 6112.

Figure 11:
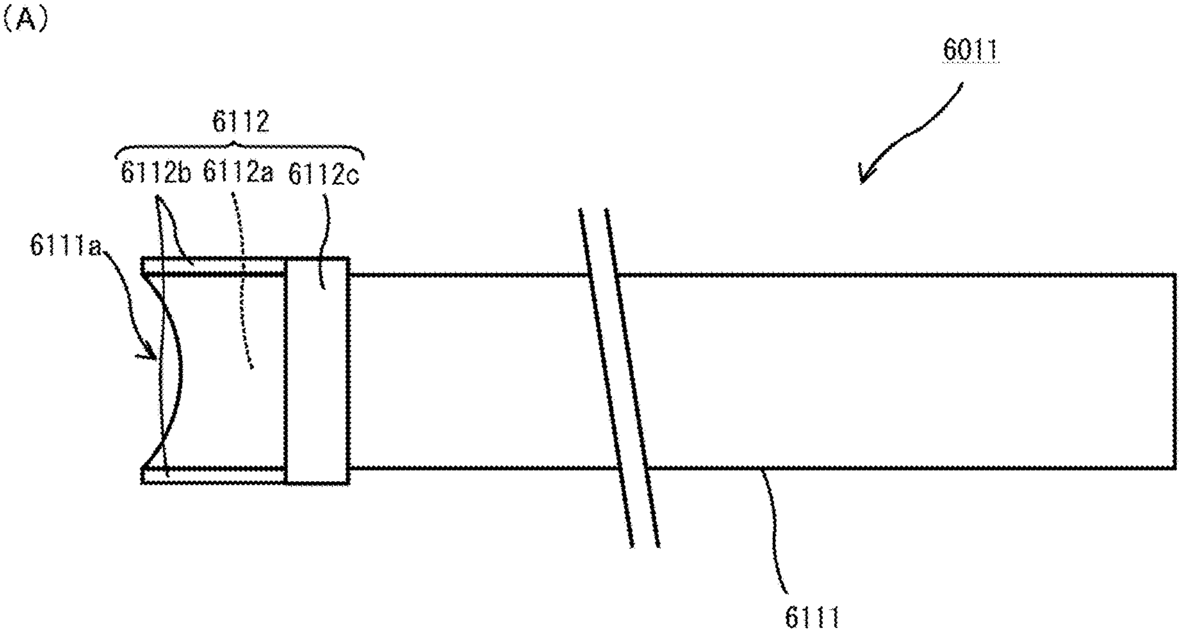
FIG. 11 illustrates a frame body according to a modification, in which (A) is a partial plan view, (B) is a side view, and (C) is a partial side view when viewed from another direction.
Figure 11:
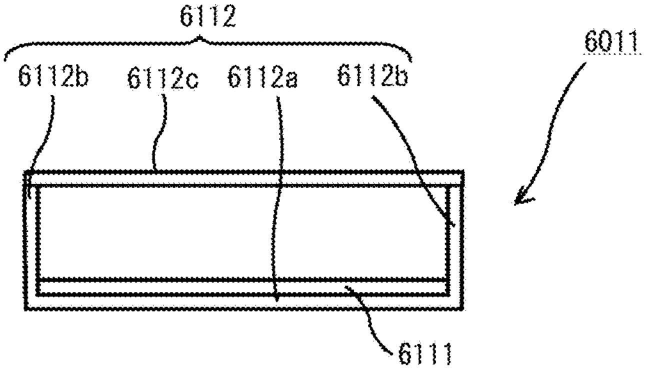
Figure 11:
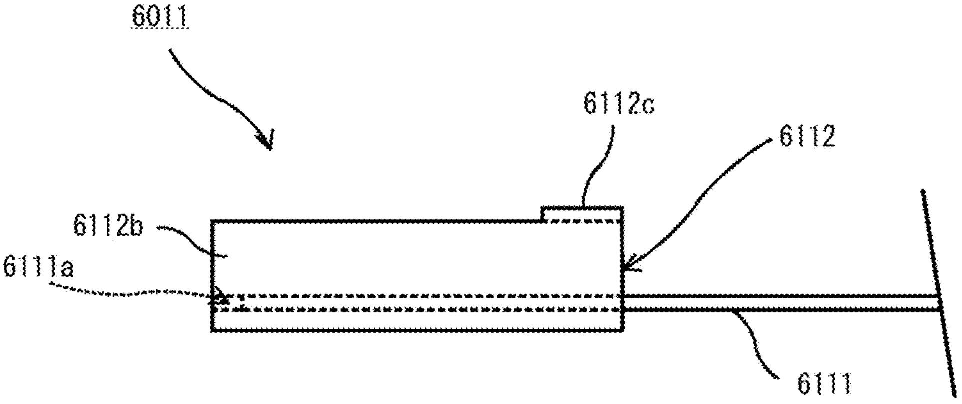
Figure 12:
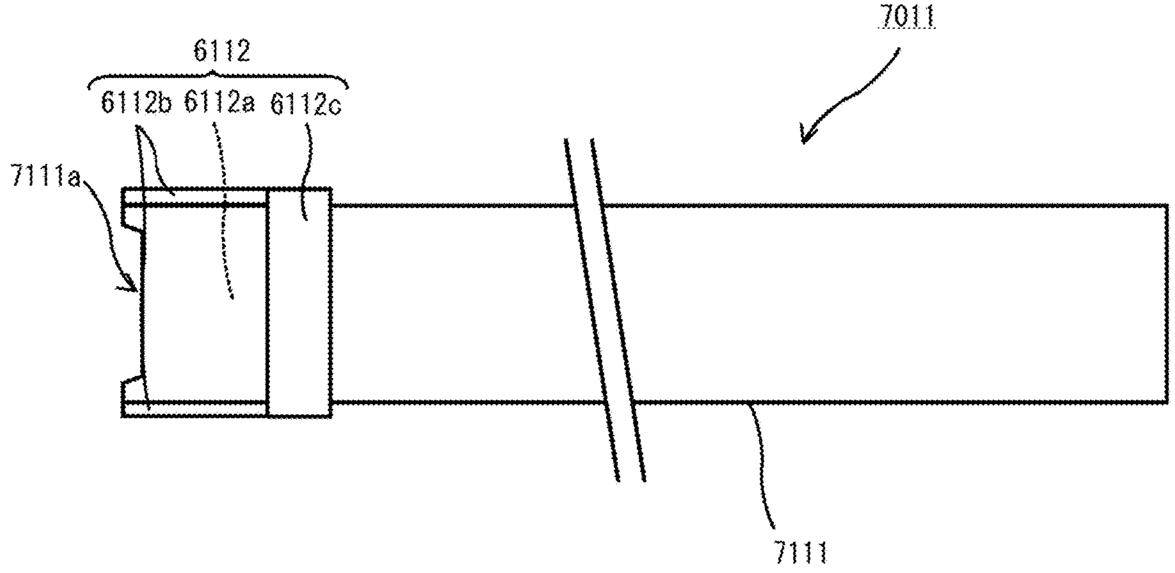
FIG. 12, (A) is a plan view of part of a frame body according to a modification, and (B) is a plan view of part of a frame body according to a modification.
Figure 12:
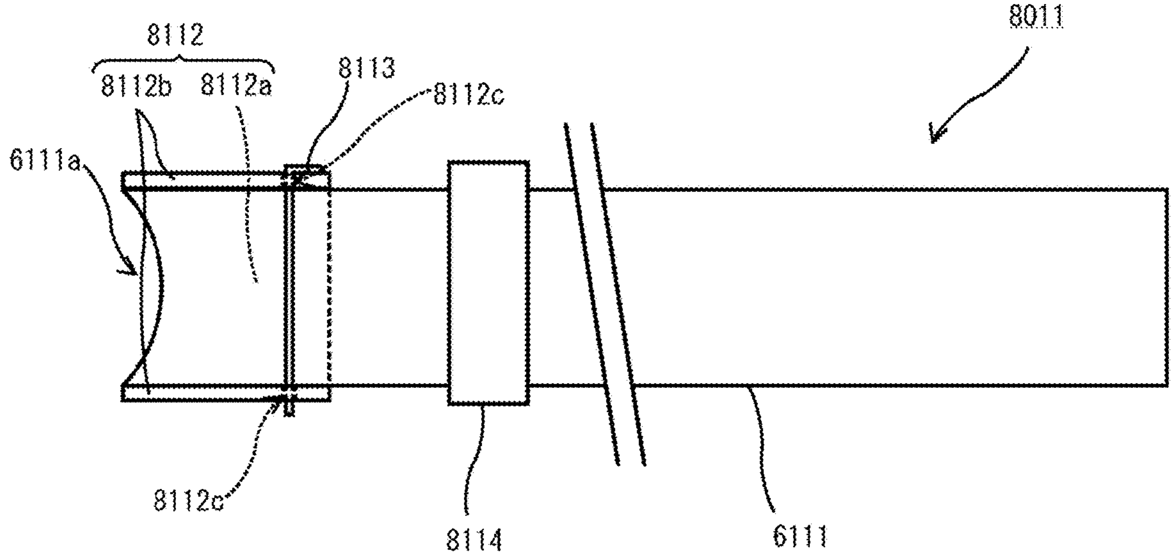

In addition, the shape of the cutout portion 6111*a* provided in the plate member 6111 is not limited to the arc shape, and for example, as in a frame body 7011 illustrated in FIG. 12(A), the plate member 7111 may be provided with a cutout portion 7111*a* having a rectangular shape in plain view. In FIG. 12, the components same as those illustrated in FIG. 11 are denoted by the reference numerals same as those in FIG. 11.

Alternatively, as illustrated in FIG. 12(B), the frame body 8011 may include the elongated plate member 6111 formed of a flexible material, a holder 8112 attached to one end of the plate member 6111 in the longitudinal direction, and an L-shaped pin 8113 attached to the holder 8112. In FIG. 12(B), the components same as those described in FIG. 11(A) are denoted by the reference numerals same as those in FIG. 11(A). The holder 8112 includes a main piece 8112*a* fixed to the plate member 6111, and two rectangular plate-shaped extension pieces 8112*b* extending in the same direction along the thickness direction of the main piece 8112*a* from both sides of the main piece 8112*a* in the short direction. The main piece 8112*a* and the extension pieces 8111*b* are continuously and integrally formed. Each of the two extension pieces 8112*b* is provided with a through hole 8112*c* penetrating in the thickness direction. The L-shaped pin 8113 is inserted into the through hole 8112*c* provided in each of the two extension pieces 8112*b*.

Figure 13:
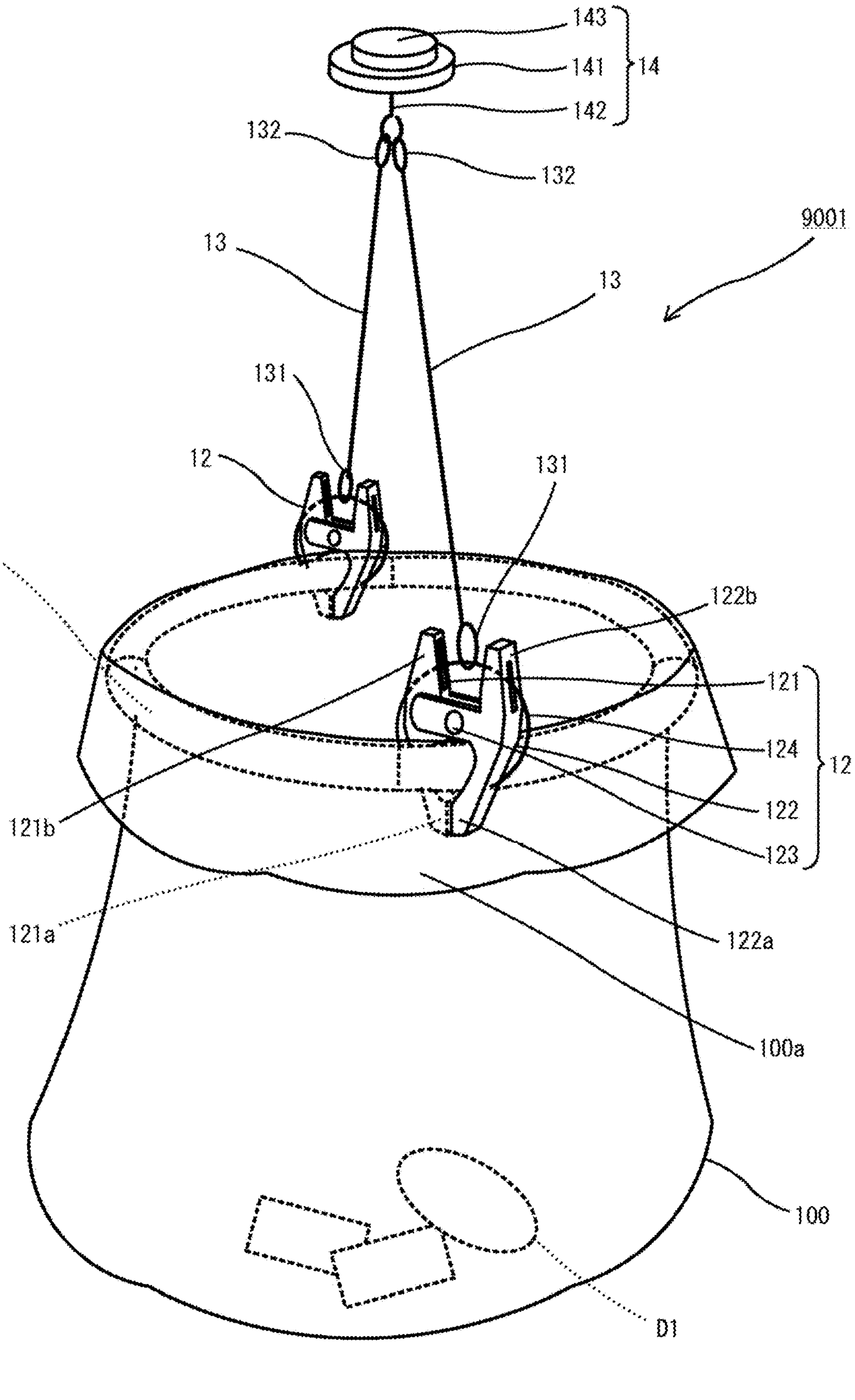
FIG. 13 is a perspective view of a collecting tool according to a modification.

In the first to fifth embodiments, the example in which the three wires 13 and the three clips 12 are provided is described, but the number of wires 13 is not limited to three and the number of clips is not limited to three. For example, as in a collecting tool 9001 illustrated in FIG. 13, two wires 13 and two clips 12 corresponding thereto may be provided. Alternatively, for example, four or more wires 13 and four or more clips 12 corresponding thereto may be provided.

In the frame body 5011 according to the fifth embodiment, a tape for enhancing the sliding performance of the plate member 4111 may be attached to the end portion of the plate member 4111. For example, as in a frame body 10011 shown in FIG. 14(A), a tape 10113 formed of a material containing polytetrafluoroethylene (PTFE) or super-high-molecular polyethylene as a main component may be attached to part of an end portion of the plate member 4111. As the tape 10113 formed of a tape material containing super-high-molecular polyethylene as a main component, for example, a "Saxin New Light" (registered trademark) adhesive tape manufactured by Saxin Corporation can be used. Here, the tape 10113 may be attached to part of the end portion of the plate member 4111, or may be attached so as to cover the entire end portion of the plate member 4111 in the width direction. The tape 10113 may be attached only to both end portions in the width direction of the end portion of the plate member 4111. Furthermore, the tape may be attached to the end portion of the extension pieces 4112*b* of the holder 4112 toward the leading end of the plate member 4111. In addition to the tape 10113, the same type of tape may be attached to the end portion, of the plate member 4111, away from the side on which the holder 4112 is mounted. Note that the holder 5113 may be omitted.

Figure 14:
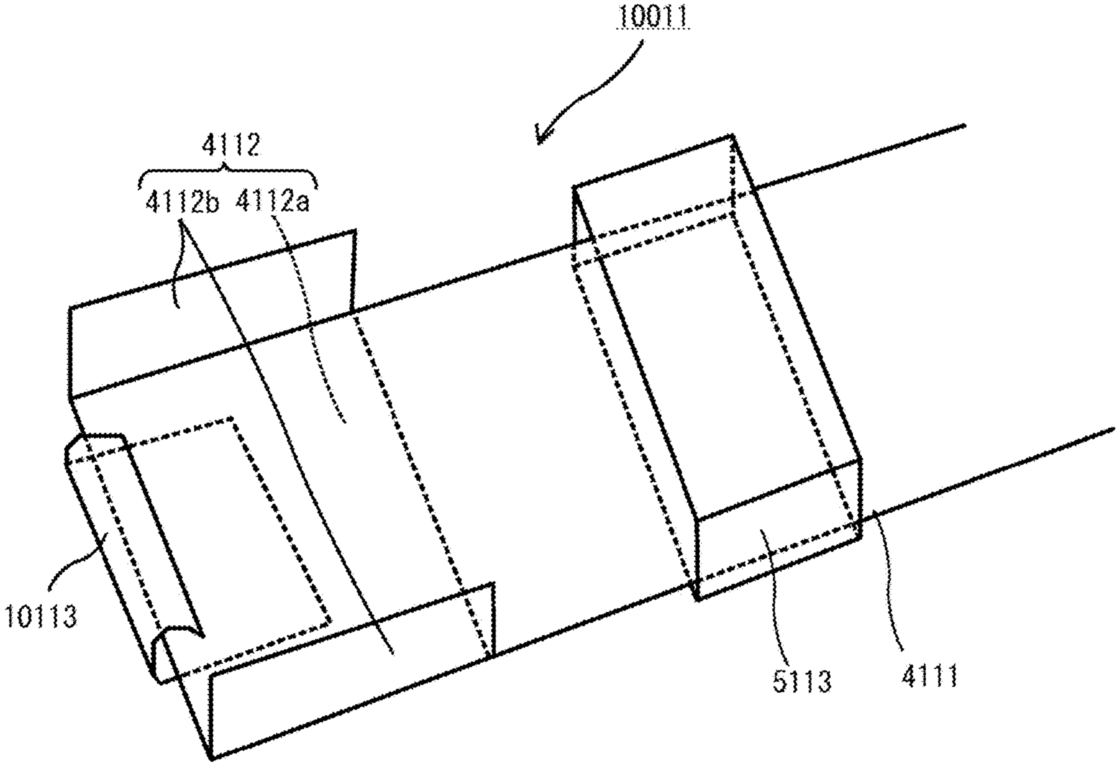
FIG. 14, (A) is a perspective view of part of a frame body according to a modification, and (B) is a perspective view of part of a frame body according to another modification.
Figure 14:
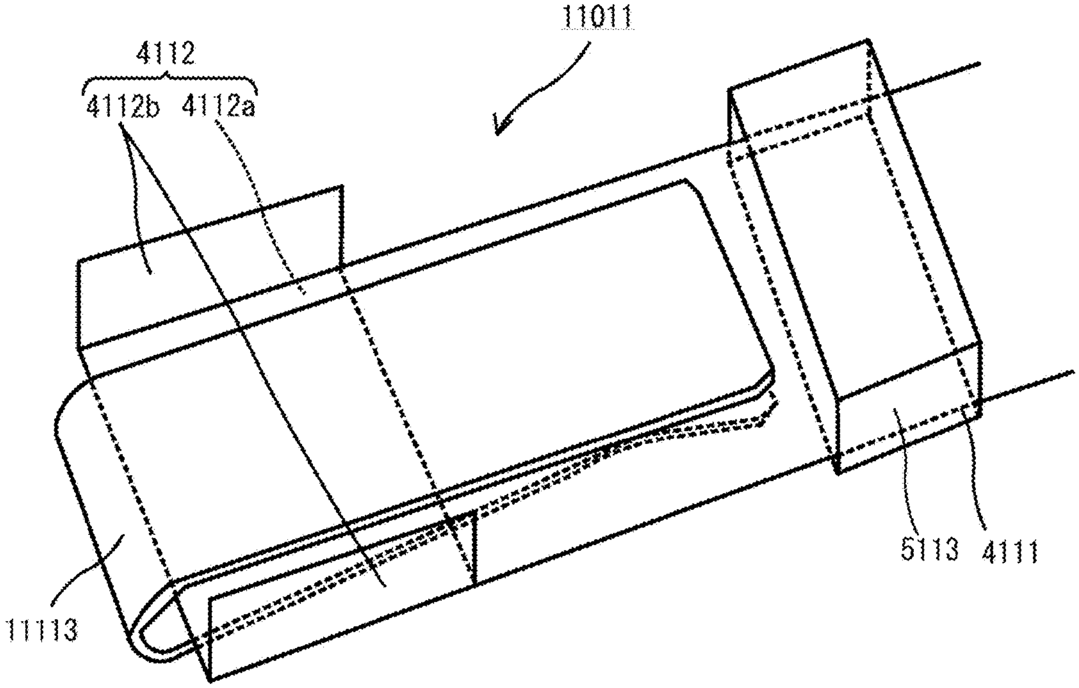

Alternatively, as in a frame body 11011 illustrated in FIG. 14(B), a clip 11113 formed of a material containing super-high-molecular polyethylene as a main component may be thrusted into an end portion of the plate member 4111. As the material containing super-high-molecular polyethylene as a main component that forms the clip 11113, for example, a "Saxin New Light" (registered trademark) injection-molded article manufactured by Saxin Corporation can be used. The clip 11113 may be made of PTFE. Furthermore, at least the extension pieces 4112*b* of the holder 4112 may be formed of the above-described material containing super-high-molecular polyethylene as a main component. Note that the holder 5113 may be omitted.

In the fourth embodiment, the example in which the L-shaped pin 4113 is attached to the holder 4112 toward the rear end portion of the plate member 4111 is described, but the position where the L-shaped pin is attached is not limited thereto. For example, as in a frame body 12011 illustrated in FIG. 15(A), the L-shaped pin 12113 may be attached to a holder 12112 toward the distal end portion of the plate member 4111. Here, the holder 12112 includes a main piece 12112*a* fixed to the plate member 4111 and two extension pieces 12112*b* extending from both sides of the main piece 12112*a* in the short direction. A through hole 12112*c* penetrates an end portion of each of the two extension pieces 12112*b* toward the distal end portion of the plate member 4111. The L-shaped pin 12113 is inserted into the through hole 12112*c* provided in each of the two extension pieces 12112*b*.

Furthermore, in the frame body 6011 according to the modification described with reference to FIGS. 11(A) to (C), an example is described in which the holder 6112 has the cover piece 6112*c* at the end portions, of the two extension pieces 6112*b*, away from the distal end portion of the plate member 6111. However, the position of the cover piece 6112*c* is not limited thereto. For example, as in a frame body 13011 illustrated in FIG. 15(B), a cover piece 13112*c* may be bridged over end portions, of two extension pieces 6112*b*, toward the distal end portion of the plate member 6111.

Figure 15:
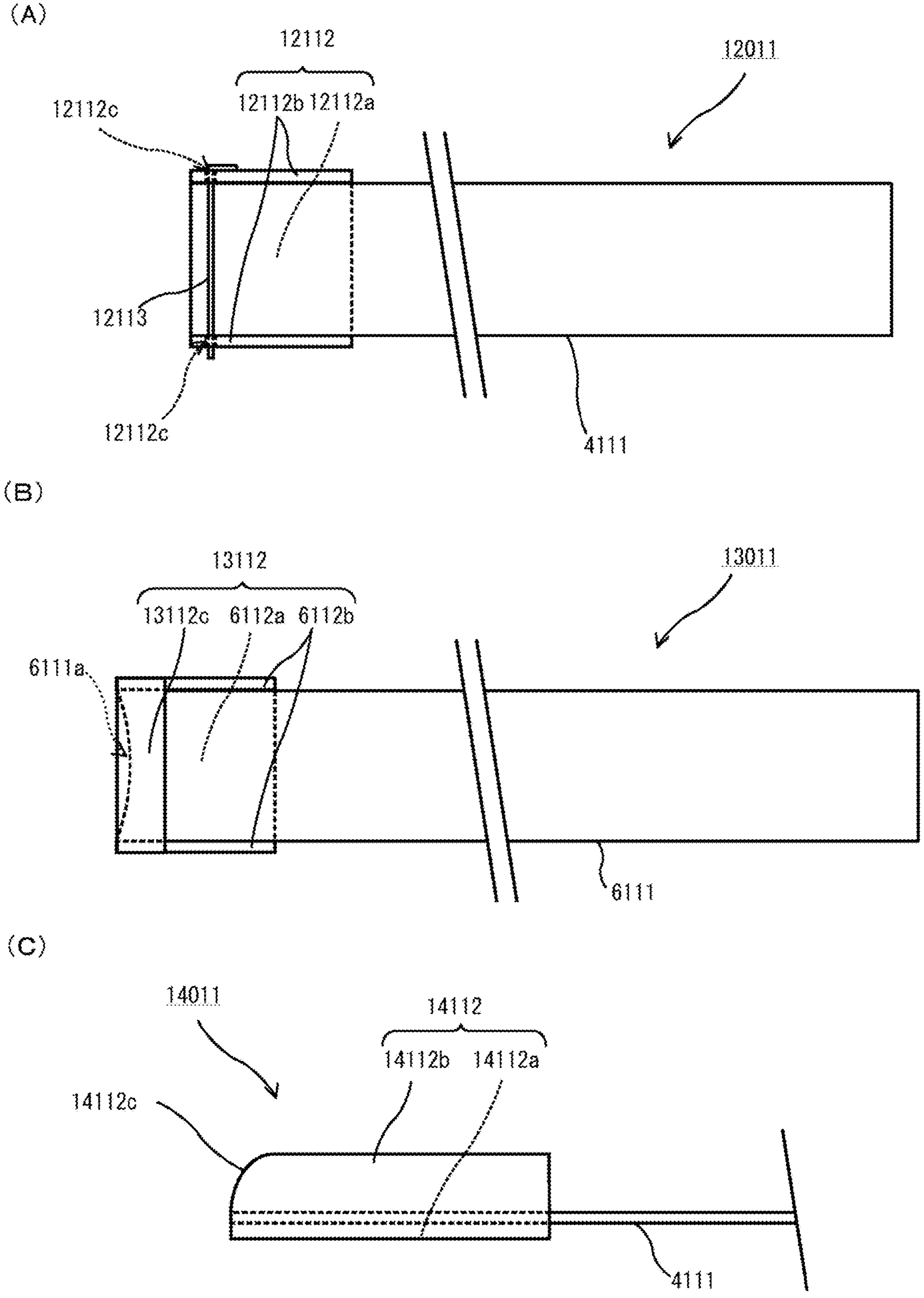
FIG. 15, (A) is a plan view of part of a frame body according to a modification, (B) is a plan view of part of a frame body according to another modification, and (C) is a side view of part of a frame body according to another modification.
Figure 16:
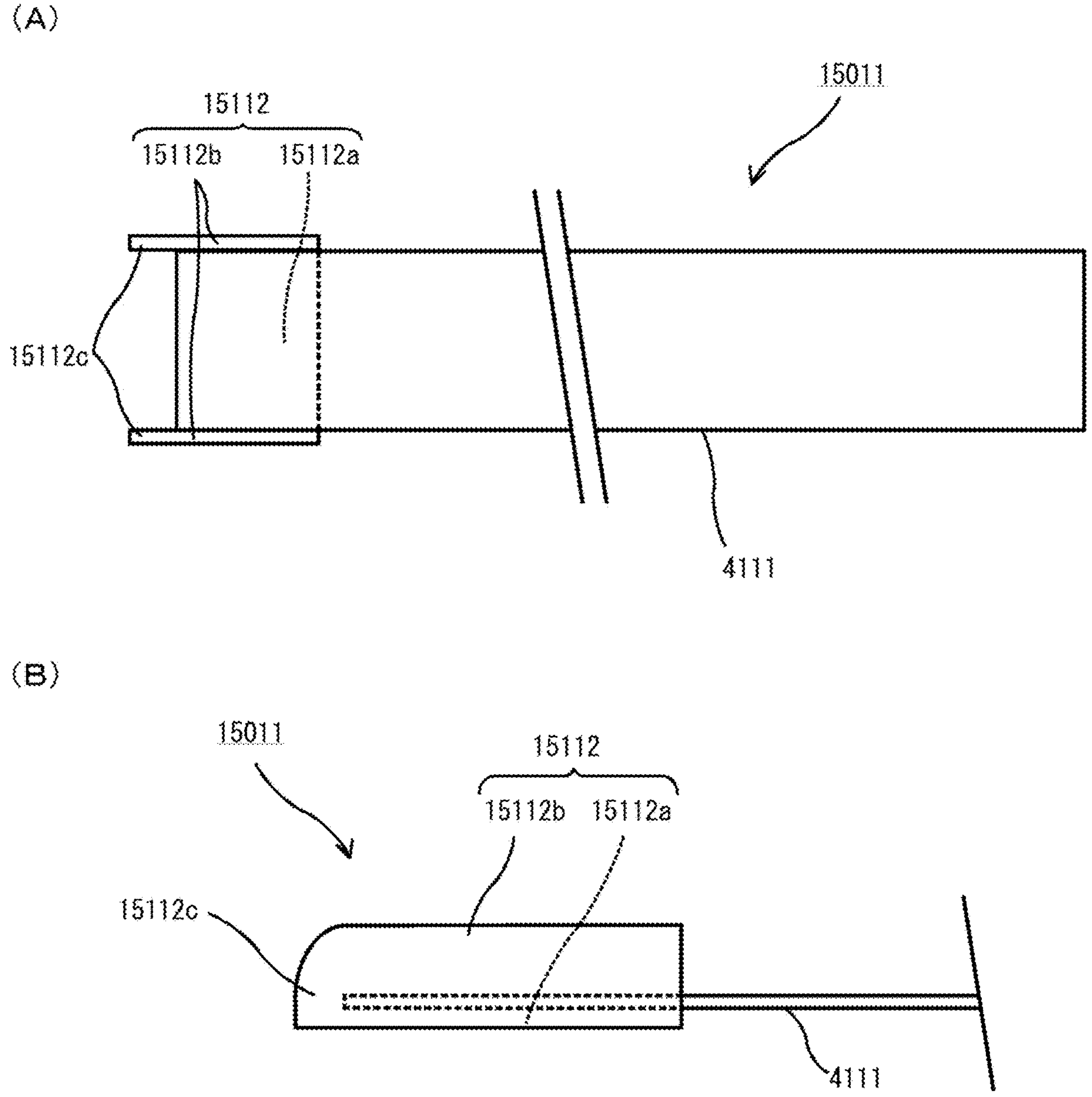
FIG. 16 illustrates a collecting tool according to a modification, in which (A) is a perspective view and (B) is a side view.

In the fourth embodiment, for example, as in a frame body 14011 illustrated in FIG. 15(C), without an L-shaped pin, a holder 14112 having a main piece 14112*a* fixed to the plate member 4111 and two extension pieces 14112*b* extending from both sides of the main piece 14112*a* in a short direction may be provided. Here, a rounded portion (R-shaped portion) 14112*c* is formed at an end portion of each of the extension pieces 14112*b* toward the distal end portion of the plate member 6111. Alternatively, as in a frame body 15011 illustrated in FIG. 16(A), a main piece 15112*a* fixed to the plate member 4111 and two extension pieces 15112*b* extending from both sides of the main piece 15112*a* in the short direction may be provided, and the end portion of each of the extension pieces 15112*b* may protrude outward of the end portion of the main piece 15112*a* at the distal end portion of the plate member 4111. Here, as illustrated in FIG. 16(B), a rounded portion (R-shaped portion) may be formed at an end portion 15112*c*, of each of the extension pieces 15112*b*, toward the distal end portion of the plate member 4111. According to this configuration, in a case where the bag 100 is attached to the frame body 15011, when the folded portion 100*a* of the bag 100 is disposed outside the frame body 15011 and the end portion of the plate member 4111 of the frame body 15011 is released, or when the frame body 15011 is disposed inside the opening end portion of the bag 100 and the end portion of the plate member 4111 of the frame body 15011 is released, it is possible to suppress detachment of the end portion of the plate member 4111 from between the two extension pieces 15112*b*. When the angle formed by the extending direction of the plate member 4111 at the end portion, of the plate member 4111, away from the holder 15112 and the extending direction of the plate member 4111 at the end portion toward the holder 15112 is close to 90 degrees, the end portion, of the plate member 4111, away from the holder 15112 is locked between the distal end portions of the two extension pieces 15112*b* in the longitudinal direction. Therefore, when the bag 100 is attached to the frame body 15011, a burden on the user gripping the end portion, of the plate member 4111, away from the holder 15112 is reduced.

A cross hole (not illustrated) for hooking the frame body to a hook (not illustrated) fixed to a construction material may be formed at a distal end portion of the frame body according to the third to fifth embodiments and these modifications.

Figure 17:
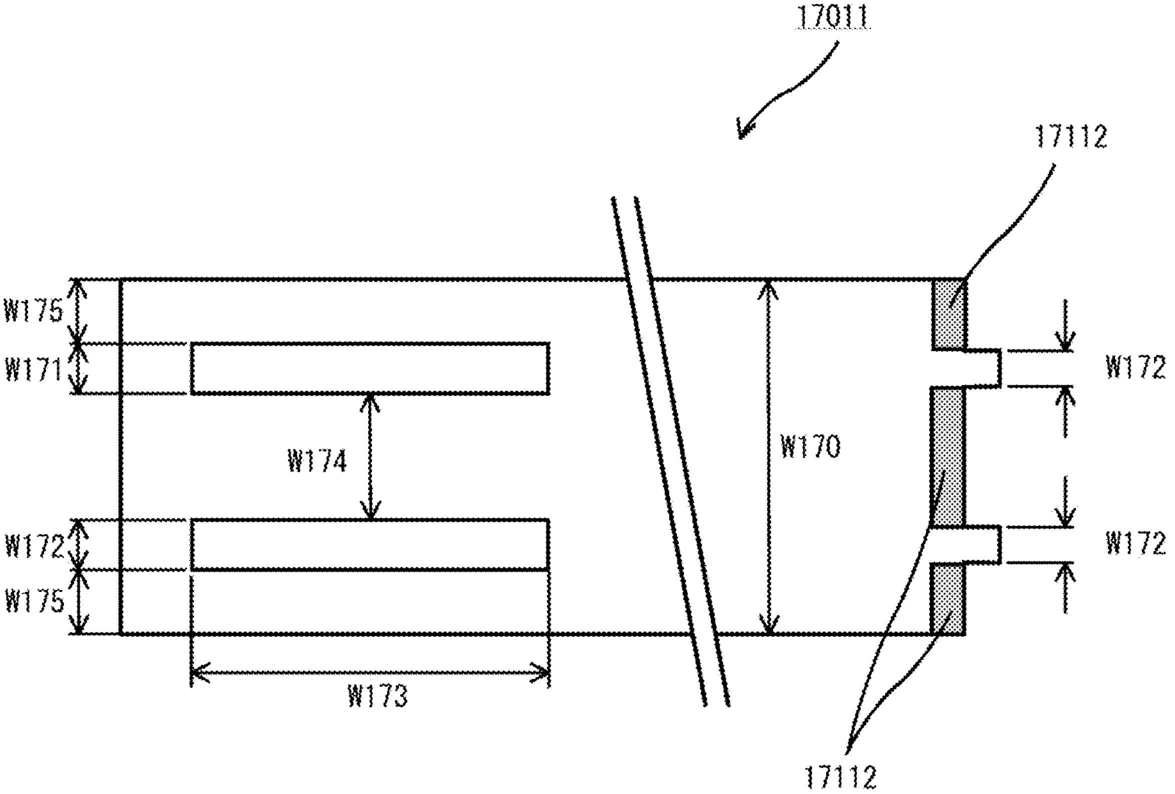
FIG. 17 is a plan view of part of a frame body according to a modification.

In the sixth embodiment, an example in which the plate member 16111 of the frame body 16011 has one slit 16111*a* and one tongue piece portion 16111*b* corresponding thereto is described. However, the number of slits and the number of tongue piece portions are not limited to one. For example, as in a frame body 17011 illustrated in FIG. 17, a plate member 17111 may have two slits 17111*a* bored at one end in the longitudinal direction so as to be parallel to each other along the longitudinal direction, and two tongue piece portions 17111*b* corresponding to the two slits 17111*a* at the other end portion in the longitudinal direction. In addition, the frame body 17011 may include a sliding member 17112 at an end portion of the plate member 17111 toward the tongue piece portion 17111*b*. Here, a width W170 of the plate member 17111 in the short direction is set to, for example, about 65 mm to 75 mm. Each of the two slits 17111*a* is provided at a position at a distance of about 10 mm from the end edge of the plate member 17111 in the short direction, and a width W171 thereof in the short direction is set to about 9 mm to 11 mm. A length W173 of each of the two slits 17111*a* in the longitudinal direction is set to, for example, about 245 mm to 255 mm when the length of the plate member 17111 in the longitudinal direction is 1 m. A distance W174 between the two slits 17111*a* is set to, for example, about 20 mm. A width W172 of each of the two tongue piece portions 17111*b* is set to be shorter than the width W171 of the slit 17111*a*, for example, about 8 mm.

Figure 18:
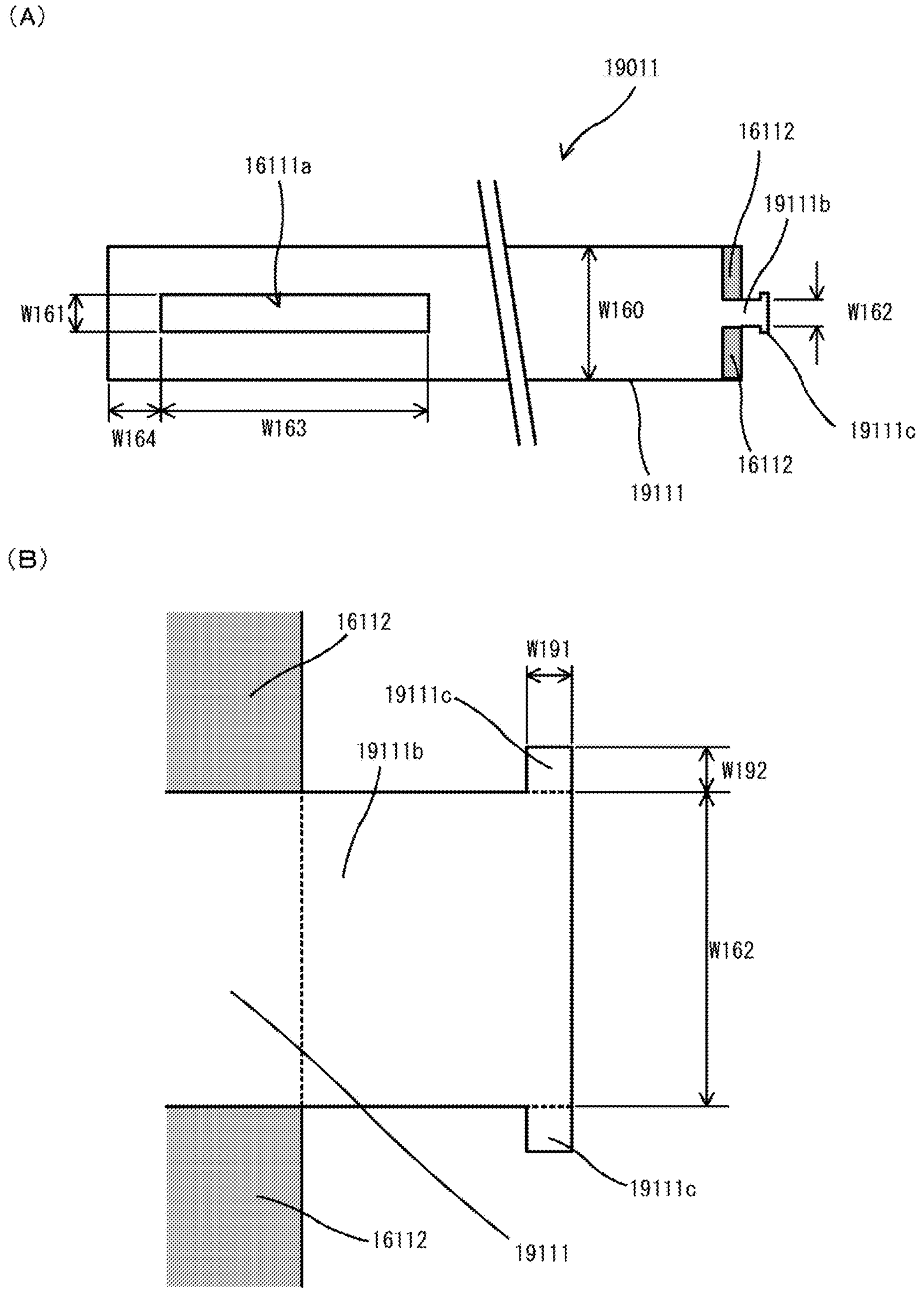
FIG. 18 illustrates a frame body according to a modification, in which (A) is a partial plan view, and (B) is a partial enlarged plan view of (A).

In the sixth embodiment, for example, as shown in FIGS. 18(A) and 18(B), the frame body 19011 may include a plate member 19111 provided with a tongue piece portion 19111*b* having two protrusions 19111*c*. In FIG. 18, the components same as those of the sixth embodiment are denoted by the reference numerals same as those in FIG. 9. The tongue piece portion 19111*b* has, at the distal end portion, the two protrusions 19111*c* protruding from both end portions in the direction orthogonal to the extending direction and the thickness direction of the tongue piece portion 19111*b*. Here, a width W191 and a length W192 of the protrusion 19111*c* are each set to about 3 mm. When the frame body 19011 is used, first, in a state in which the plate member 19111 is curved in an annular shape, and then the tongue piece portion 19111*b* is slightly twisted around the central axis along the extending direction thereof, the tongue piece portion 19111*b* is fitted into the slit 16111*a* of the plate member 19111 from the inside. Thereafter, when the tongue piece portion 19111*b* is released, the tongue piece portion 19111*b* is restored to the original posture, and the two protrusions 19111*c* are locked to the outer peripheral portion of the slit 16111*a* in the plate member 19111.

Figure 19:
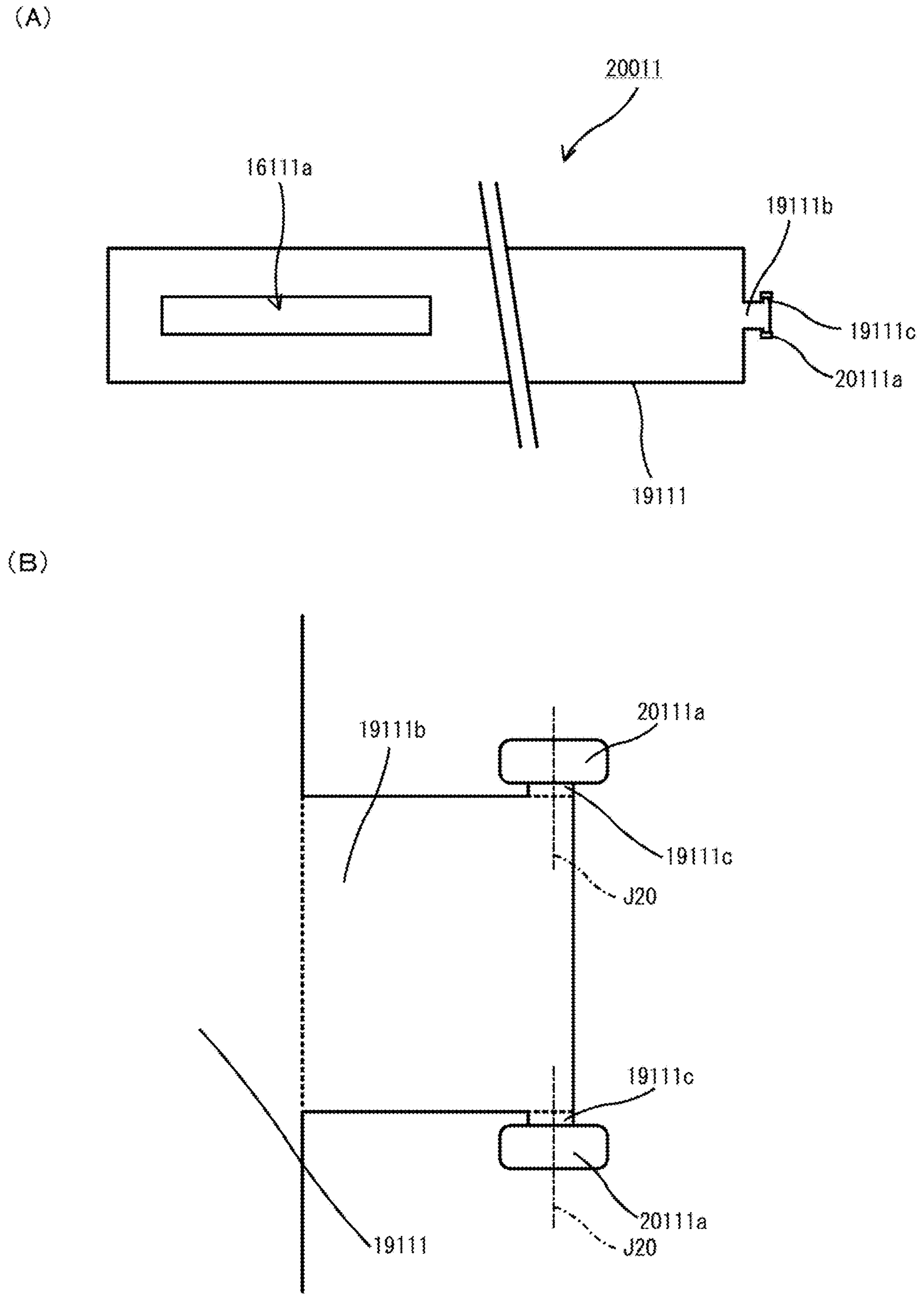
FIG. 19 illustrates a frame body according to a modification, in which (A) is a partial plan view, and (B) is a partial enlarged plan view of (A).

In addition, for example, as shown in FIGS. 19(A) and 19(B), a frame body 20011 may further include a bearing 20111*a* provided in each of the two protrusions 19111*c* and disposed such that the rotation axis 320 is parallel to the direction orthogonal to the extending direction and the thickness direction of the tongue piece portion 19111*b*.

According to the frame bodies 17011, 19011, and 20011 according to these modifications, as in the frame body 16011 according to the sixth embodiment, they can be used while periodically changing the curving direction of each of the plate members 17111, 19111, and 20111, so that the restoring force of the plate members 17111, 19111, and 20111 can be maintained for a long period of time. Therefore, at the time of use, the force of pressing the folded portion 100*a* or the opening end portion of the bag 100 from the inside by each of the frame bodies 17011, 19011, and 20011 can be maintained for a long period of time.

Figure 20:
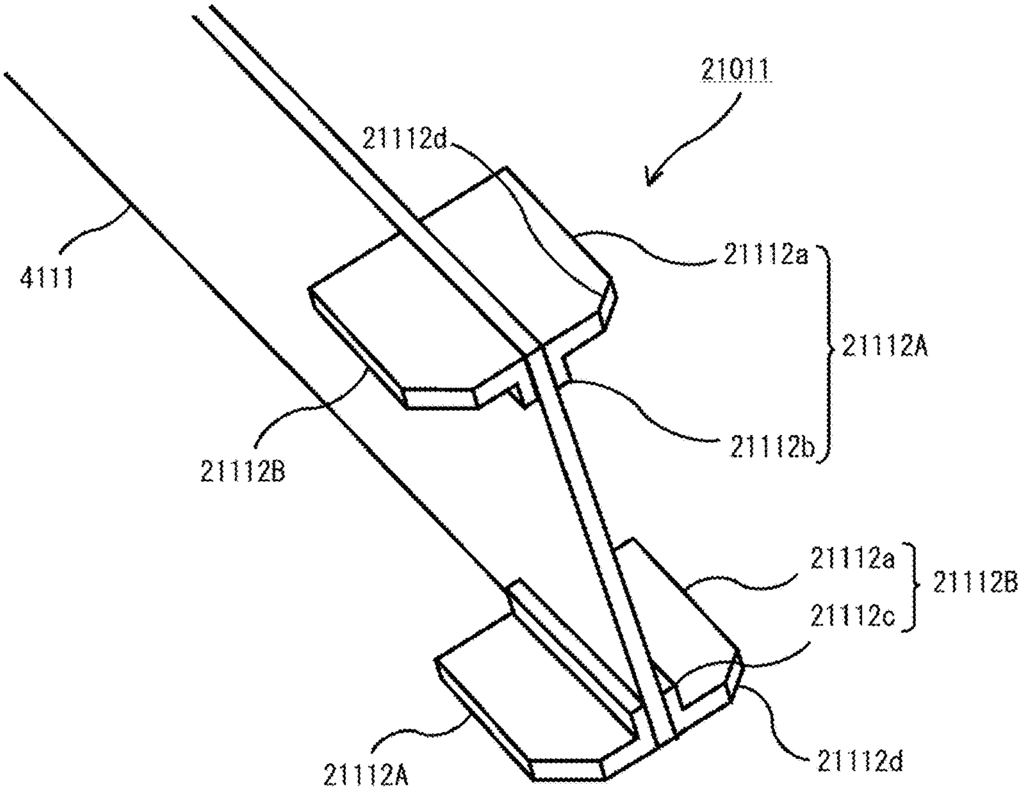
FIG. 20 illustrates a frame body according to a modification, in which (A) is a partial perspective view, and (B) is a partial side view.
Figure 20:
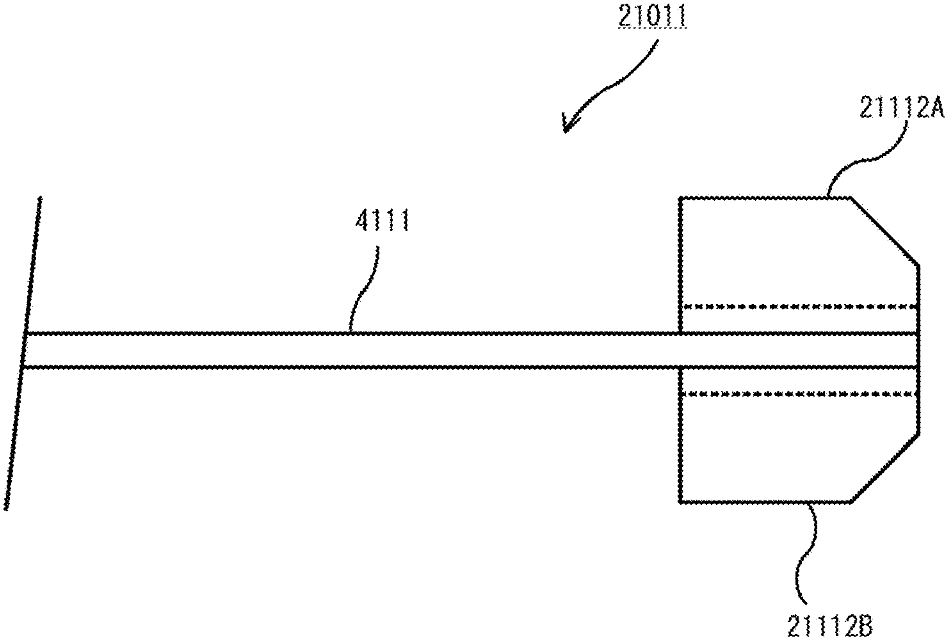

In the fourth embodiment, for example, as in a frame body 21011 shown in FIGS. 20(A) and 20(B), an L-shaped pin may not be mounted, and a holder having four guide portions 21112A and 21112B may be provided. Here, the two pairs of guide portions 21112A and 21112B are fixed to both end portions in the short direction at each of both faces of the plate member 4111 in the thickness direction at one end of the plate member 4111. The guide portion 21112A includes a fixing piece 21112*b* having an elongated rectangular plate shape and fixed to the plate member 4111, and a guide piece 21112*a* having a shape in which a tapered portion 21112*d* is formed at one corner portion of the rectangular plate and extending from one end portion of the fixing piece 21112*b* in the short direction to one side of the fixing piece 21112*b* in the thickness direction. In addition, the guide portion 21112B includes a fixing piece 21112*c* having an elongated rectangular plate shape and fixed to the plate member 4111, and a guide piece 21112*a* extending from the other end portion away from the guide portion 21112A in the short direction of the fixing piece 21112*c* to one side of the fixing piece 21112*c* in the thickness direction.

Figure 21:
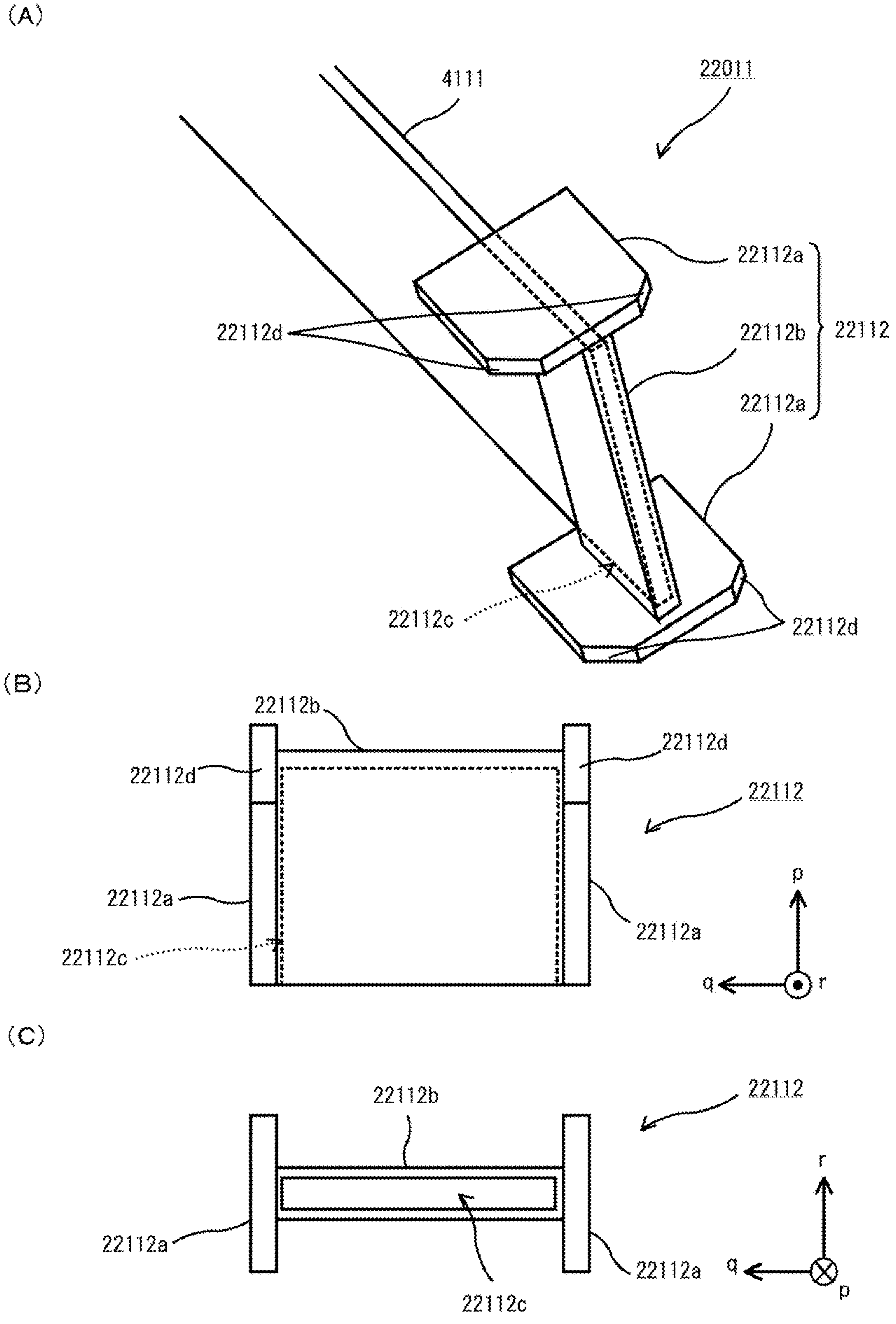
FIG. 21, (A) is a perspective view of part of a frame body according to a modification, (B) is a plan view of a holder according to the modification, and (C) is a side view of the holder according to the modification.

In addition, for example, as in a frame body 22011 illustrated in FIG. 21(A), a holder 22112 attached to one end portion of the plate member 4111 in the longitudinal direction may be provided. Here, as illustrated in FIGS. 21(B) and 21(C), the holder 22112 includes a rectangular plate-shaped main body 22112*b* and a pair of guide pieces 22112*a* continuously formed integrally with the main body 22112*b*. The main body 22112*b* has, at one end face, a recess 22112*c* that is recessed in a direction orthogonal to the thickness direction and the one end face and into which one end of the plate member 4111 in the longitudinal direction is fitted. The pair of guide pieces 22112*a* extends from each of a pair of end faces orthogonal to the one end face, of the main body 22112*b*, in which the recess 22112*c* is formed to both face sides of the plate member 4111 in the thickness direction. Each of the pair of guide pieces 22112*a* has a shape in which tapered portions 22112*d* are formed at two corner portions of the rectangular plate. Here, the +p side end portion of the main body 22112*b* is recessed to the −p side relative to the +p side end portion of the guide piece 22112*a*. As a result, in a case where the bag 100 is attached to the frame body 22011, when the folded portion 100*a* of the bag 100 is disposed outside the frame body 22011 and the end portion of the plate member 4111 of the frame body 22011 is released, or when the frame body 22011 is disposed inside the opening end portion of the bag 100 and the end portion of the plate member 4111 of the frame body 22011 is released, it is possible to suppress detachment of the end portion of the plate member 4111 from between the pair of guide pieces 22112*a*. Further, the width of the pair of guide pieces 22112*a* in the short direction can be shortened. Furthermore, even when the angle formed by the extending direction of the plate member 4111 at the end portion, of the plate member 4111, away from the holder 22112 and the extending direction of the plate member 4111 at the end portion toward the holder 22112 is close to 90 degrees, the end portion, of the plate member 4111, away from the holder 22112 is locked between the distal end portions of the pair of guide pieces 22112*a* in the longitudinal direction. Therefore, when the bag 100 is attached to the frame body 22011, a burden on the user gripping the end portion, of the plate member 4111, away from the holder 22112 is reduced.

Figure 22:
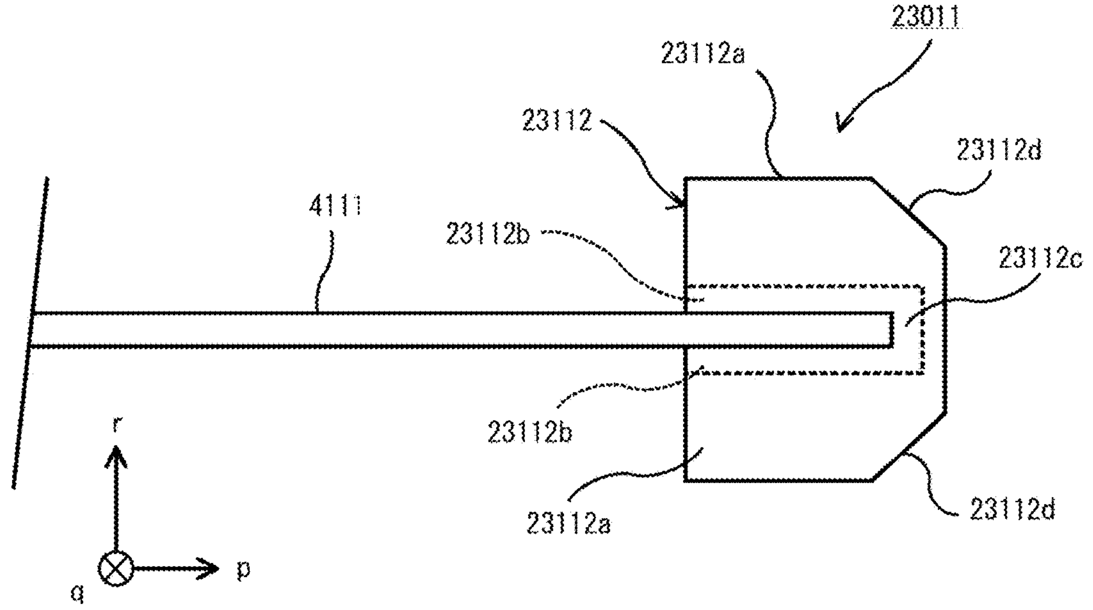
FIG. 22, (A) is a side view of part of a frame body according to a modification, and (B) is a perspective view of a holder according to the modification.
Figure 22:
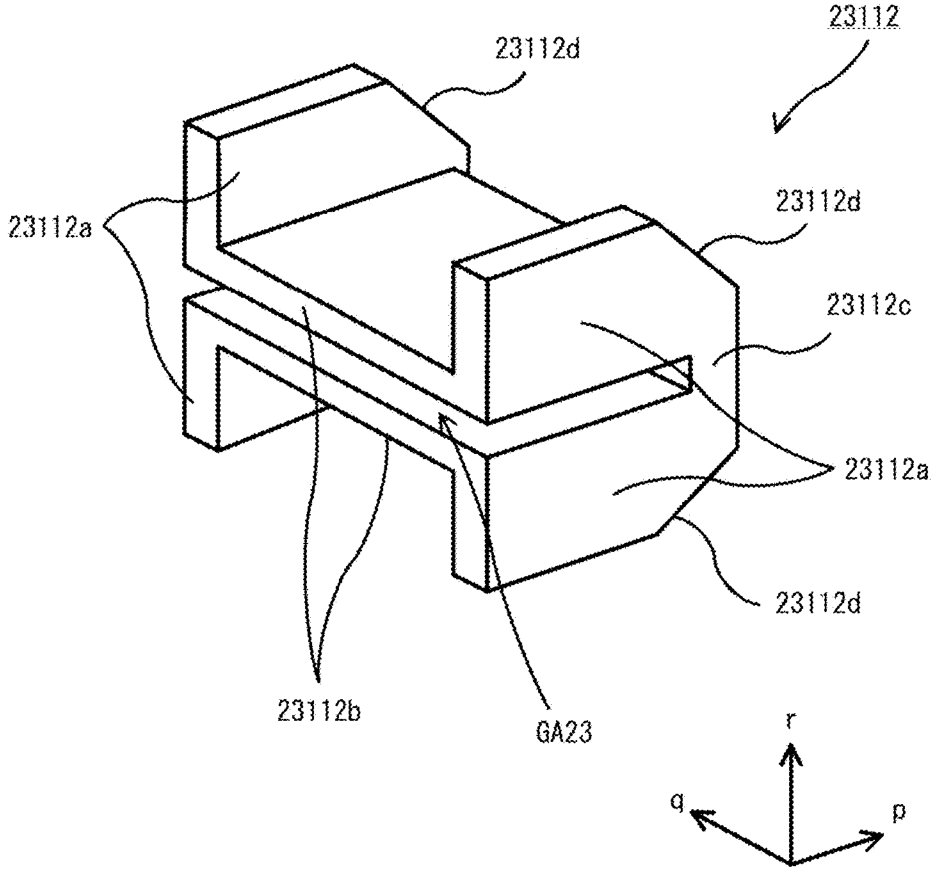

Furthermore, for example, as in a frame body 23011 illustrated in FIG. 22(A), a holder 23112 attached to one end portion of the plate member 4111 in the longitudinal direction may be provided. Here, as illustrated in FIG. 22(B), the holder 23112 includes a pair of clamping pieces 23112*b* that has a rectangular plate shape, and clamps the plate member 4111 from both sides of the plate member 4111 in the thickness direction at one end of the plate member 4111 in the longitudinal direction, and a coupling piece 23112*c* that couples end portions, of the pair of clamping pieces 23112*b*, in the first direction orthogonal to the thickness direction of each of the pair of clamping pieces 23112*b*, that is, in the +p direction, and a guide piece 23112*a*. The guide piece 23112*a* has a shape in which a tapered portion 23112*d* is formed at one corner of a rectangular plate. In addition, the guide pieces 23112*a* extend from each of both end portions of the pair of clamping pieces 23112*b* in the q axis direction orthogonal to the +p direction to a direction away from the facing clamping pieces 23112*b* in the thickness direction of the pair of clamping pieces 23112*b*. Then, by fitting the end portion of the plate member 4111 into a gap GA23 formed between the pair of clamping pieces 23112*b* of the holder 23112, the holder 23112 is attached to the plate member 4111. Here, the +p side end portion of each of the pair of clamping pieces 23112*b* is recessed to the −p side relative to the +p side end portion of the guide piece 23112*a*. As a result, in a case where the bag 100 is attached to the frame body 22011, when the folded portion 100*a* of the bag 100 is disposed outside the frame body 22011 and the end portion of the plate member 4111 of the frame body 22011 is released, or when the frame body 22011 is disposed inside the opening end portion of the bag 100 and the end portion of the plate member 4111 of the frame body 22011 is released, it is possible to suppress detachment of the end portion of the plate member 4111 from between the pair of guide pieces 23112*a*. Further, the width of the pair of guide pieces 23112*a* in the short direction can be shortened. Furthermore, even when the angle formed by the extending direction of the plate member 4111 at the end portion, of the plate member 4111, away from the holder 23112 and the extending direction of the plate member 4111 at the end portion toward the holder 23112 is close to 90 degrees, the end portion, of the plate member 4111, away from the holder 23112 is locked between the distal end portions of the pair of guide pieces 23112*a* in the longitudinal direction. Therefore, when the bag 100 is attached to the frame body 22011, a burden on the user gripping the end portion, of the plate member 4111, away from the holder 23112 is reduced.

Meanwhile, in the frame body 4011 according to the fourth embodiment, the plate member 4111 is curved such that the side, of the holder 4112, from which the two extension pieces 4112*b* extend faces outward. Therefore, when the collecting tool is used for a long period of time, the plate member 4111 changes over time, and there is a possibility that the plate member 4111 is in a curved state even if the end portion, of the plate member 4111, away from the holder 4112 is released from the holder 4112. In this case, the restoring force of the plate member 4111 decreases, and the force with which the frame body 4011 presses the folded portion 100*a* or the opening end portion of the bag 100 from the inside decreases. On the other hand, according to each modification described with reference to FIGS. 20 to 22, the guide pieces 21112*a*, 22112*a*, and 23112*a* extend to both face sides of the plate member 4111 in the thickness direction. As a result, it is possible to use the plate member while periodically changing the curving direction of the plate member 4111, and thus, it is possible to maintain the restoring force of the plate member 4111 for a long period of time. Therefore, at the time of use, the force of pressing the folded portion 100*a* or the opening end portion of the bag 100 from the inside by each of the frame bodies 21011, 22011, and 23011 can be maintained for a long period of time.

Figure 23:
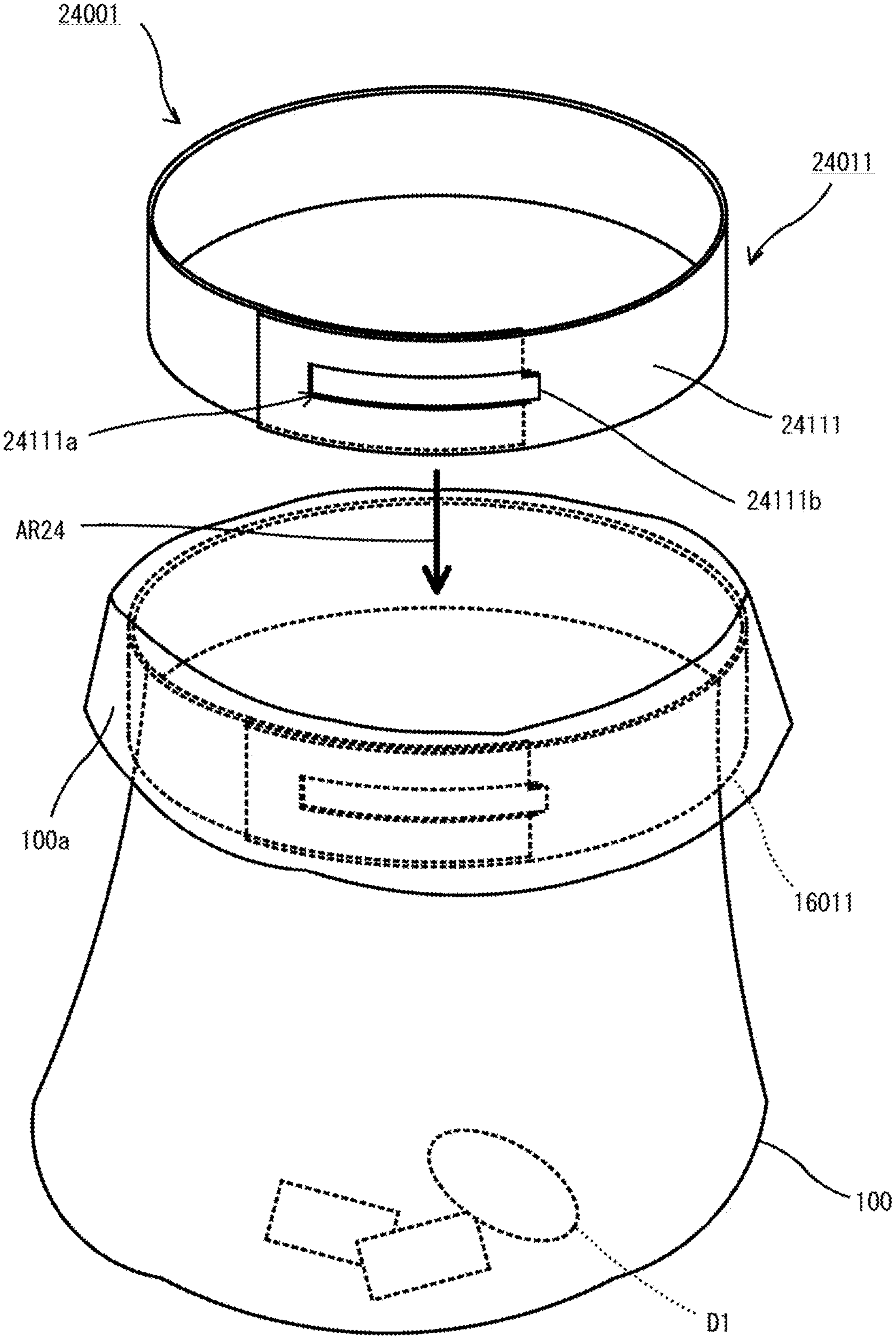
FIG. 23 is a perspective view of a collecting tool according to a modification.

In each embodiment, an example of the collecting tool including one frame body is described. However, for example, as in a collecting tool 24001 illustrated in FIG. 23, an auxiliary frame body 24011 disposed inside the frame body 16011 according to the sixth embodiment may be provided. Here, the auxiliary frame body 24011 includes a plate member 24111 formed elongated from a flexible material, having a slit 24111*a* bored at one end in the longitudinal direction along the longitudinal direction, and having a rectangular plate-shaped tongue piece portion 24111*b* extending from the other end portion in the longitudinal direction.

In the collecting tool 24001 according to the present modification, first, in a state where the frame body 16011 is held such that the area inside the frame body 16011 is smaller than the area of the opening of the bag 100, the opening end portion of the bag 100 is inserted into the frame body 16011, and the opening end portion of the bag 100 is folded back to the outside of the frame body 16011. Then, the folded portion 100*a* of the bag 100 is disposed outside the frame body 16011. Next, when the frame body 16011 is released, due to the restoring force of the frame body 16011, the inner area of the frame body 16011 is deformed so as to expand, and the folded portion 100*a* of the bag 100 is pressed from the inside. Then, the auxiliary frame body 24011 is fitted into the frame body 16011 as indicated by an arrow AR24. Next, when the auxiliary frame body 24011 is released, the area inside the auxiliary frame body 24011 is deformed so as to expand by the restoring force of the auxiliary frame body 24011, and the bag 100 is pressed against the inside of the frame body 16011. In this manner, the bag 100 is firmly fixed to the frame body 16011 in a state of being clamped between the frame body 16011 and the auxiliary frame body 24011.

Figure 24:
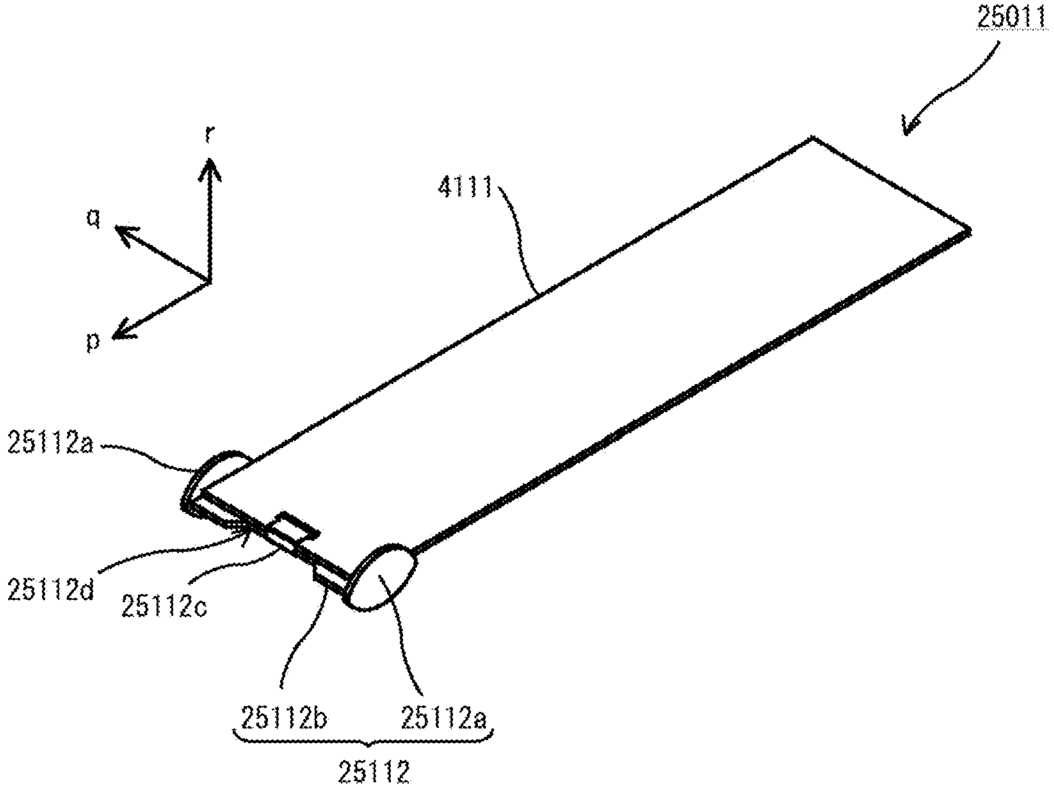
FIG. 24 is a perspective view of a frame body according to a modification.
Figure 24:
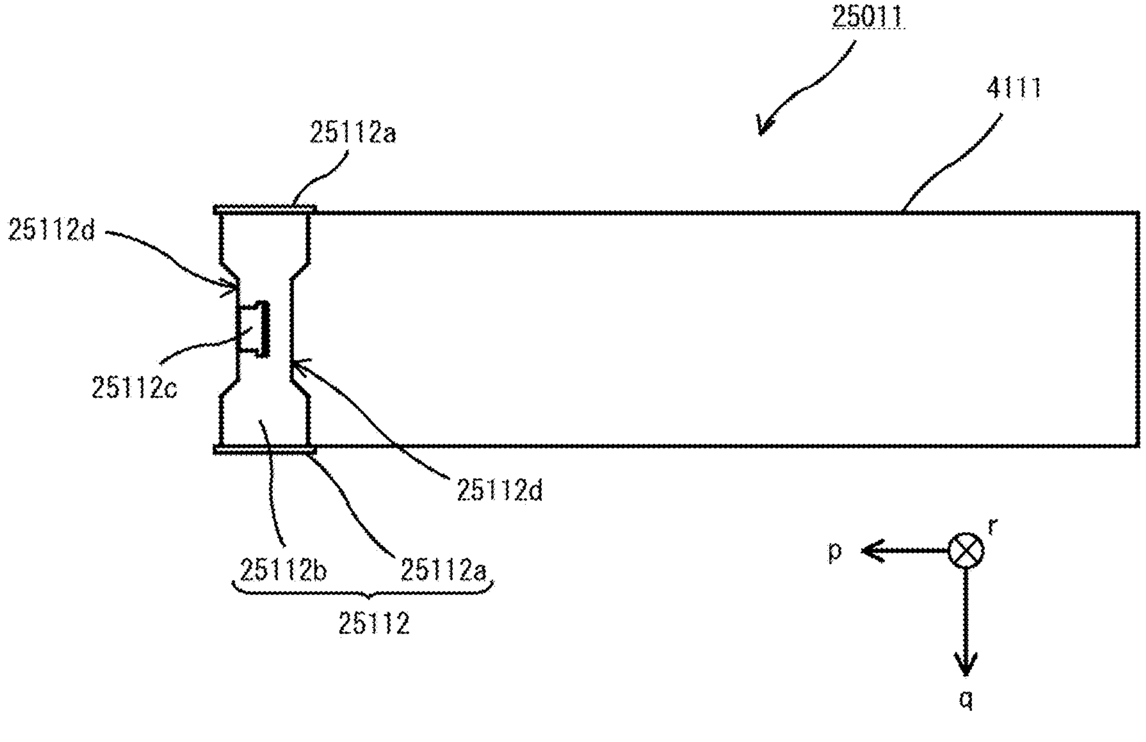

In each embodiment, for example, a holder 25112 attached to one end portion of the plate member 4111 in the longitudinal direction as in a frame body 25011 illustrated in FIGS. 24(A) and 24(B) may be provided. Here, the holder 25112 includes a long main piece **25112*b*, a pair of guide pieces 25112*a* continuous at both end portions of the main piece 25112*b* in the short direction, and a clip 25112*c* for fixing the main piece 25112*b* to the plate member 4111. Cutout portions 25112*d* are formed at both end portions of a main piece 25112*b* in the short direction. Each of the pair of guide pieces 22112*a*** has an elliptical shape in plain view.

In the first embodiment, the frame body may include a plurality of flexible tubular bodies and a connector that connects the tubular bodies. Here, the tubular body may be formed of a material such as rubber or elastomer that can be cut with a cutter, scissors, or the like. In this case, the tubular body can be cut to a desired length and used.

In the first to sixth embodiments, the example in which the fixing portion 14 includes the permanent magnet 143 is described, but the present invention is not limited to the configuration including the permanent magnet 143. Instead of the permanent magnet 143, the fixing portion may include a hook that can be hooked on, for example, a beam of a building or a hooked portion attached to a construction material of a building. Alternatively, the fixing portion may have an annular member that can be hooked on a hook attached to a construction material of a building.

In the first to sixth embodiments and the modifications, the example in which the wire 13 is provided is described, but the present invention is not limited thereto, and a configuration without a wire may be used. The clip may have a permanent magnet for attracting and fixing the collecting tool to the metal member. Here, the clip may be, for example, a clip in which a permanent magnet is disposed at any one of the ends, of the two clamping pieces 121 and 122, away from the jaws **121*a* and 122*a***.

Although the embodiments and modifications of the present invention have been described above, the present invention is not limited thereto. The present invention includes an appropriate combination of the embodiments and the modifications, and an appropriate modification thereof.

INDUSTRIAL APPLICABILITY

The present invention is suitable as a waste collecting tool using a bag.

REFERENCE SIGNS LIST

1, 2001, 9001, 18001, 24001 collecting tool
11, 2011, 3011, 4011, 5011, 6011, 7011, 8011, 10011, 11011, 12011, 13011, 14011, 15011, 16011, 17011, 19011, 20011, 21011, 22011, 23011, 25011 frame body
12, 18012, **25112*c*** clip
13 wire
14 fixing portion
100 bag
**100*a*, 18100*a*** folded portion
111 tubular member
**111*a*, 141, 2112*a*** main body
**111*b*** coupling portion
**111*c*** inner side
**111*d*** bottom wall
121, 122 clamping piece
**121*a*, 122*a*** jaw
**121*b*, 122*b*** gripping portion
123 support shaft
124 ring spring
131, 132 eyes
142 hook
143 permanent magnet
2111, 3111, 4111, 16111, 17111, 19111, 20111, 24111 plate member
**2111*a*** hole
2112, 3112, 3113, 4112, 5113, 6112, 8112, 25112 holder
**2112*b*** pin
**2112*c*** shaft
**2112*d*** support
**4112*a*, 6112*a*, 8112*a*, 15112*a*, 25112*b*** main piece
**4112*b*, 6112*b*, 8112*b*, 15112*b*** extension piece
**4112*c*, 8112*c*** through hole
4113, 8113 L-shaped pin
**6112*c*** cover piece
**16111*a*, 17111*a*, 24111*a*** slit
**16111*b*, 17111*b*, 19111*b*, 24111*b*** tongue piece portion
18100 duct
18009 vacuum cleaner
**18009*a*** suction port
18091 intake fan
**19111*c*** protrusion
**20111*a*** bearing
**21112*a*, 22112*a*, 23112*a*, 25112*a*** guide piece
**21112*d*, 23112*d*** tapered portion
**22112*c*** recess
**23112*b*** clamping piece
**23112*c*** coupling piece
24011 auxiliary frame body
D1 waste

The invention claimed is:

1. A collecting tool comprising:
a frame body that is disposed so as to surround an opening end portion of a bag that stores waste inside, and on which the opening end portion of the bag is hooked;
a clip that clamps the frame body and the opening end portion of the bag together in a state where the opening end portion of the bag is hooked on the frame body,
wherein the frame body includes:
a plate member formed elongated from a flexible material, having an elongated slit bored at one end portion in a longitudinal direction and extending along the longitudinal direction, and having a rectangular plate-shaped tongue piece portion extending from the other end portion in the longitudinal direction,
wherein the tongue piece portion is movable along an extending direction of the frame body by being guided in the elongated slit, with the tongue piece fitted into the elongated slit from an inside of the frame body, and
wherein, when the other end portion of the plate member is released after the opening end portion of the bag is inserted into the plate member curved in an annular shape and the opening end portion of the bag is folded back to an outside of the plate member in a state where the other end portion of the plate member curved in an annular shape is held such that an area inside the plate member curved in an annular shape is smaller than an area of the opening end portion of the bag, and then the opening end portion of the bag is disposed outside the plate member curved in an annular shape, or
the plate member is disposed inside the opening end portion of the bag in a state where the one end portion of the plate member curved in an annular shape is held such that the area inside the plate member curved in an annular shape is smaller than the area of the opening end portion of the bag, the area inside the plate member is deformed to be increased by a restoring force of the plate member, and the opening end portion of the bag is pressed from an inner side.

2. The collecting tool according to claim 1, further comprising an auxiliary frame body including a plate member that is formed elongated from a flexible material, has a slit bored at one end portion in the longitudinal direction along the longitudinal direction, and has a rectangular plate-shaped tongue piece portion extending from the other end portion in the longitudinal direction, the auxiliary frame body being disposed inside the frame body.

3. The collecting tool according to claim 1, further comprising:

at least one wire; and a fixing portion that supports the at least one wire and is fixed to a fixed portion, wherein the clip is provided at an end portion of the at least one wire.

4. The collecting tool according to claim 3, wherein the fixing portion includes a permanent magnet capable of being attracted to a metal member provided on the fixed portion.

* * * * *